(12) United States Patent
Mueller

(10) Patent No.: US 7,502,280 B2
(45) Date of Patent: Mar. 10, 2009

(54) POSITION INDICATOR, MEASURING APPARATUS AND METHOD OF MANUFACTURING A POSITION INDICATOR

(76) Inventor: Stephan Johannes Mueller, 8, rue Cavour, Genf (CH) 1203

( * ) Notice: Subject to any disclaimer, the term of this patent is extended or adjusted under 35 U.S.C. 154(b) by 813 days.

(21) Appl. No.: 10/522,435

(22) Filed: Jan. 19, 2005

(65) Prior Publication Data
US 2008/0066335 A1 Mar. 20, 2008

Related U.S. Application Data

(63) Continuation of application No. PCT/EP03/07792, filed on Jul. 17, 2003.

(30) Foreign Application Priority Data
Jul. 19, 2002 (DE) ................................. 102 32 895

(51) Int. Cl.
G04B 19/06 (2006.01)
G04B 19/20 (2006.01)
G01L 7/00 (2006.01)
G01D 13/00 (2006.01)
G01P 3/42 (2006.01)

(52) U.S. Cl. .......................... 368/77; 368/233; 73/700; 116/284; 116/298; 324/160; 374/100

(58) Field of Classification Search .................. 368/76, 368/77, 223, 233–234; 73/37, 700; 116/284, 116/298, 300, 308, 309, 318; 324/160; 374/100, 374/187, 190; 235/78 R–78 RC
See application file for complete search history.

(56) References Cited

U.S. PATENT DOCUMENTS 2,437,621 A * 3/1948 Strate ........................ 235/78 R 3,803,831 A * 4/1974 Horzick ....................... 368/233
4,653,930 A * 3/1987 Schmid ........................ 368/77
5,350,955 A   9/1994 Street
5,943,300 A * 8/1999 Johnson ........................ 368/77
6,463,012 B1 * 10/2002 Bar-Yona ...................... 368/80
6,754,139 B2 * 6/2004 Herbstman et al. ............ 368/77
6,813,222 B1 * 11/2004 De Salivet
                          De Fouchecour ............ 368/77
2003/0021190 A1   1/2003 Jolidon
2003/0210611 A1 * 11/2003 Bloch ........................... 368/77
2008/0068931 A1 * 3/2008 Buttet et al. ................... 368/37

FOREIGN PATENT DOCUMENTS

| DE | 24 32 106 A1 | 1/1976 |
|---|---|---|
| DE | 28 11 807 A1 | 9/1979 |
| DE | 35 03 672 A1 | 8/1986 |
| DE | 39 07 873 A1 | 11/1989 |
| DE | 693 14 645 T2 | 2/1998 |

(Continued)

*Primary Examiner*—Vit W Miska
(74) *Attorney, Agent, or Firm*—Jones Day

(57) ABSTRACT

A position indicator comprises: a first indicator pattern composed of a plurality of substantially identical first partial patterns periodically arranged in a direction of extension, and a second indicator pattern composed of a plurality of substantially identical second partial patterns periodically arranged in the direction of extension. The first partial patterns may extend, along a first line extending transversely to the direction of extension, and the second partial patterns may extend along a second line extending transversely to the first line and the direction of extension The first and second partial patterns may be each composed of plural sub-patterns disposed adjacent to one another in the direction of extension. The sub-patterns of each pair of sub-patterns of the respective partial pattern are different from each other.

18 Claims, 22 Drawing Sheets

FOREIGN PATENT DOCUMENTS

| | | |
|---|---|---|
| EP | 0 365 443 B1 | 12/1993 |
| EP | 1 168 112 A1 | 1/2002 |
| GB | 353572 | 7/1931 |
| GB | 1296565 | 11/1972 |
| GB | 2 206 712 A | 1/1989 |
| WO | WO 01/59530 A1 | 8/2001 |

* cited by examiner

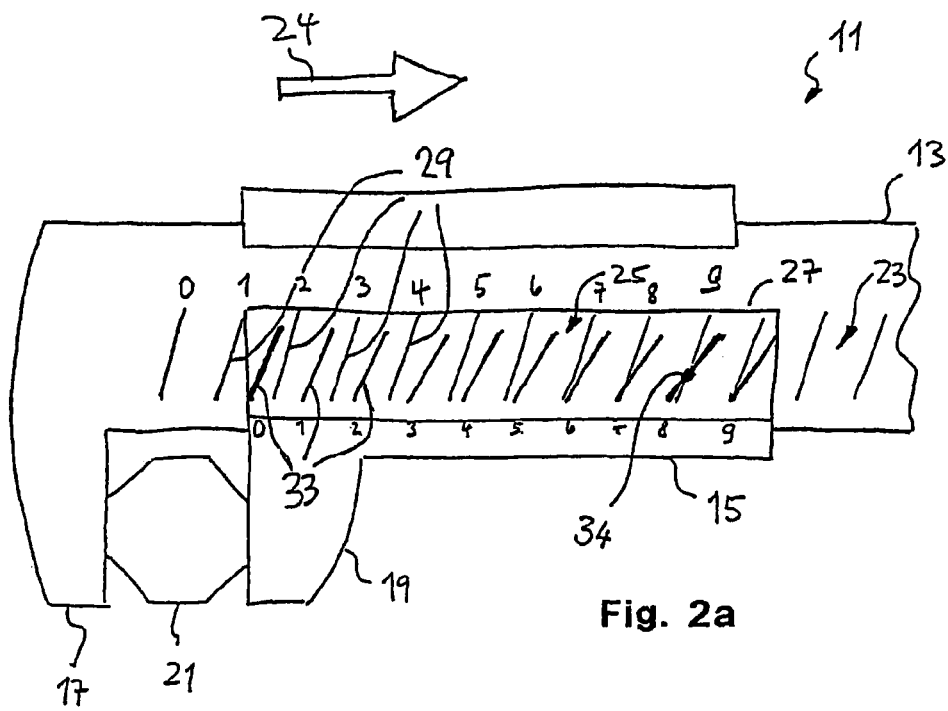
Fig. 2a
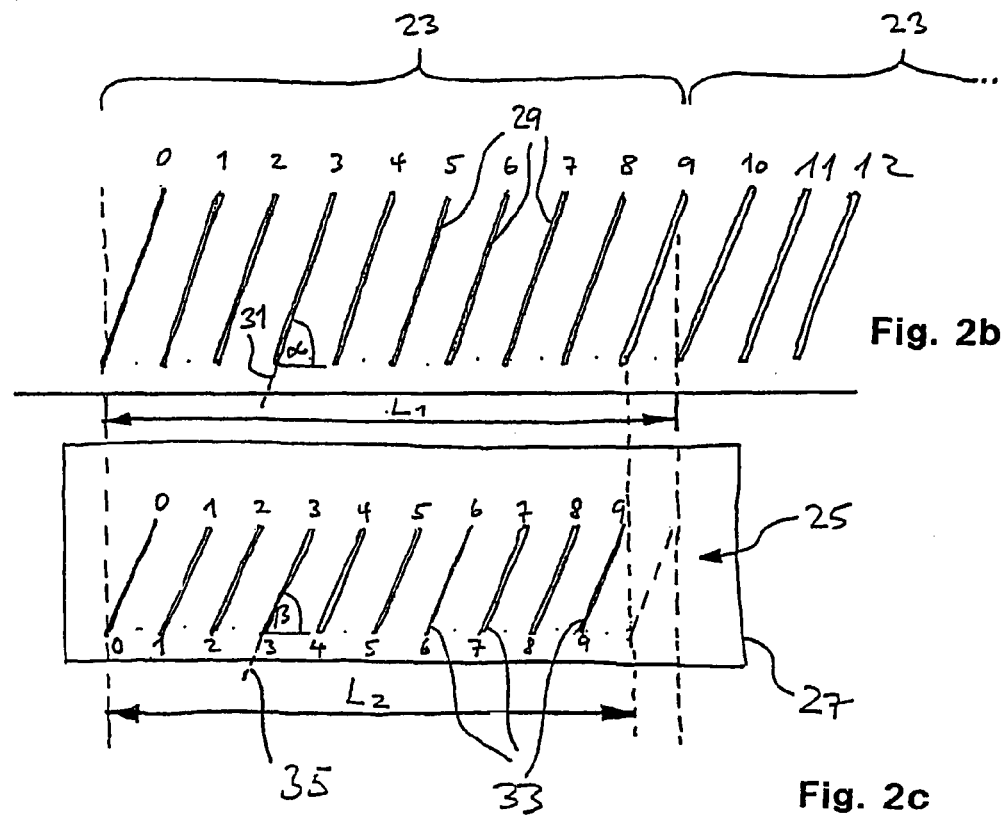
Fig. 2b
Fig. 2c

POSITION INDICATOR, MEASURING APPARATUS AND METHOD OF MANUFACTURING A POSITION INDICATOR

CROSS REFERENCE TO RELATED APPLICATIONS

This application is a continuation of International Patent Application No. PCT/EP2003/007792, filed Jul. 17, 2003 which claims priority to German Patent Application No. 102 32 895.1 filed Jul. 19, 2002, the contents of which are incorporated herein by reference.

BACKGROUND OF THE INVENTION

1. Field of the Invention

The present invention relates to an indicator for indicating a relative position of two components that are displaceable relative to one another, a measuring apparatus comprising such position indicator and a method of manufacturing an indicator pattern.

2. Brief Description of Related Art

FIG. 1 shows a conventional caliper gauge for determining geometric dimensions of physical objects. Caliper gauge 1 comprises two components 3, 5 which are linearly displaceable relative to one another. Each component 3, 5 has one measuring leg 7, 9, respectively, which can be brought to rest on the object to be measured. The two components 3 and 5 bear indicator patterns 11, 13, respectively, which are conventionally termed scale or Nonius (vernier).

The first indicator pattern 11 of component 3, the scale, comprises a plurality of partial patterns 4, all of which are configured as markings and are spaced a distance of 1 mm apart from one another in a direction of displacement of the two components 3 and 5, i.e. recur in a periodic or regular pattern. In particular, over a length $L_1$ of 20 mm $N_1=20$ of such partial patterns 4, or partial markings, respectively, are disposed such that a distance between two partial patterns 4 is 1 mm. The indicator pattern 13, the Nonius, comprises $N_2=20$ partial patterns 6, which are regularly spaced over a length $L_2=19$ mm. Such a 19/20-Nonius allows an accuracy of reading of 1 mm–19/20 mm=0.05 mm.

When reading the caliper gauge, the zero mark of the Nonius 13 is regarded as the decimal point. Left of the zero mark, the full millimeters are read off the scale 11. Subsequently, that partial mark 6 to the right of the zero mark of the Nonius 13 is selected that substantially aligns with partial mark 4 of scale 11. The number of partial marks 6 on the Nonius 13 between its zero mark and the aligned mark indicates the number of 1/20 millimeters behind the decimal point.

Those caliper gauges have, however, turned out to have a limited accuracy of reading. Furthermore, the caliper gauge described above is only suitable for measurement of linear, geometric distances.

SUMMARY OF THE INVENTION

The present invention has been accomplished taking the above problems into consideration.

Accordingly, it is an object of the present invention to provide an alternative position indicator which enables, in particular, a more accurate reading.

Furthermore, it is an object of the present invention to provide a position indicator for two components which are movable relative to one another, but it is not limited to components which are linearly movable relative to one another.

Accordingly, the present invention provides an accurate indicator for indicating a relative position of two components which are displaceable relative to one another, wherein a first of the two components has a first indicator pattern fixedly disposed thereon, and a second of the two components has a second indicator pattern fixedly disposed thereon.

The indicator patterns may be indicator patterns of any kind which are perceptible by the eye of a user, such that the user can deduce the relative position of the two components with the indicator patterns by looking at the two indicator patterns. For this purpose, each of the two indicator patterns is composed of a plurality of substantially identical partial patterns, wherein the partial patterns are disposed so as to recur periodically in a direction of extension in order to form the respective indicator patterns.

According to an exemplary embodiment, a number $N_1$ of partial patterns of the first indicator pattern is equal to a number $N_2=N_1/n$ ($n=1,2,3,\ldots$) of partial patterns of the second indicator pattern. In addition, the $N_1$ partial patterns of the first indicator pattern extend over a length $L_1$ whereas the $N_2$ partial patterns of the second indicator pattern extend over a length $L_2$, with the following relationship being fulfilled:

$$L_2=L_1(1\pm 1/N_1).$$

According to further exemplary embodiment, the partial patterns of the first as well as the second indicator pattern extend over the same length $L_2=L_1$, but the number of partial patterns of the two indicating patterns differs by one so that the following relationship is fulfilled:

$$N_2=N_1/n\pm 1\ (n=1,2,3,\ldots)$$

For $n=2,3,\ldots$, the second indicator pattern is correspondingly expanded, which facilitates the reading of the position indicating device, i.e. makes it more convenient to use.

The present invention is further characterized in that the two indicator patterns comprise additional indication features for increasing the accuracy of reading of the position indicating device. In particular, the first and second partial patterns are configured such that they allow the relative position of the components with respect to one another to be read with a higher accuracy than an accuracy of a Nonius scale having a $(N_1/n)-1$ to $N_1/n$-partitioning.

The provision of this accuracy increasing indication feature therefore allows, in particular, an easier and/or more accurate reading of the relative position of the two components that are movable relative to one another. The position indicating device is, in particular, suitable for indicating a relative position of two components which are displaceable relative to one other in a linear fashion, wherein the partial patterns are disposed to be periodically adjacent to one another in a direction of displacement. It is also anticipated that in other embodiments, the position indicating device indicates a rotational position of two components that may be rotated with respect to one another. In those embodiments, the partial patterns are periodically arranged along a circumference of the components such that they are adjacent to one another in a direction of circumference.

The direction of extension in which the partial patterns are periodically adjacent is, however, not limited to a linear direction of displacement or a direction of circumference. On the contrary, it is possible to dispose the partial patterns along (notional) lines and curves that may be freely defined, wherein the direction of extension is then a local direction of extension at different locations of the curves.

According to a further exemplary embodiment of the present invention, the first partial pattern has a configuration (or shape) that extends along a first line, which first line extends transversely to the direction of extension. The second partial pattern has a configuration (or shape) that extends along a second line, which second line also extends transversely to the direction of extension. The first and second lines are disposed at different angles with respect to the direction of extension. When the two components are displaced relative to one another, an intersection of the first and second partial patterns along the line will also be displaced. The user can then deduce a relative position of the two components by estimating the location of the intersection along the line.

In a further exemplary embodiment, the first line with the first partial pattern extends orthogonally to the direction of extension, and the second line with the second partial pattern extends orthogonally to the first line.

The configuration (or shape) of the first or second partial patterns, respectively, in that embodiment is an elongated configuration (or shape) along the line and may be composed of a plurality of substantially separate sub-patterns.

Such a sub-pattern (of a partial pattern) may comprise at least one transparent portion which is provided within a substantially non-transparent surrounding.

The first and second lines may comprise straight lines.

When the position indicating device is applied to a watch or clock, for instance, wherein the two components are rotatable relative to one another about a rotational axis, it is preferred that the following relationship is fulfilled:

$$N_1 = N_2 = 12$$

In an exemplary embodiment, five sub-patterns may be disposed such that they are spaced apart from one another in a radial direction with respect to the rotational axis.

According to a further exemplary embodiment, each of the two partial patterns is composed of a plurality of sub-patterns, wherein the sub-patterns are arranged to be adjacent to one another in the direction of extension. The sub-patterns are different from one another such that there are no like pairs. This means that the individual sub-patterns of the partial patterns are perceptibly different for a user or an observer, respectively, and that each sub-pattern of a partial pattern has a feature which makes it different from all other sub-patterns of the same partial pattern. This feature can be, for instance, an optically perceptible feature such as a shade of color, a saturation of color, a texture, or the like. For the purpose of the present invention, two sub-patterns are, however, not different from one another because they are merely disposed at different locations in the range of view of the user. However, while it is anticipated that the sub-patterns are configured such that they are distinguishable by way of optical perception, they may also be configured such that they can be distinguished in other ways by a user. Sub-patterns may, for instance, be distinguishable by tactile perception.

According to a further exemplary embodiment, the sub-patterns of the partial patterns of the first indicator pattern and the sub-patterns of the partial patterns of the second indicator pattern are associated with each other in pairs, such that each sub-pattern of the partial pattern of the indicator pattern has associated therewith exactly one sub-pattern of the partial pattern of the other indicator pattern. The sub-patterns are then disposed within their partial patterns in such a way that, for every position of displacement of the two components relative to one another, there is only exactly one partial pattern, out of the plurality of partial patterns, a sub-pattern of which is disposed adjacent to or overlapping an associated sub-pattern of one of the partial patterns of the other indicator patterns.

This association can be provided in that the associated sub-patterns have a similar or substantially the same shade of color, a similar or substantially the same saturation of color, or in that they are similar or substantially identical with respect to their texture or surface structure. "Texture" as used herein is a constitution or quality of a surface area of the sub-pattern that is achieved by provision of a color pattern or structuring of the surface that forms the sub-pattern. Provision of the color pattern comprises, for instance, hatches, sub-patterns, configurations with patterns of any kind, or, for instance, patterns of characters or symbols such as letters or numbers and the like.

The sub-patterns may, on the other hand, also be configured such that an overlap of sub-patterns associated with one another is perceptible by a user because a variation in brightness, the shade of color, the saturation of color, the texture or the like in the direction of extension is smaller in an area where the associated sub-patterns overlap than in areas where other pairs of sub-patterns overlap.

An overlap of associated sub-patterns of two indicator patterns may be achieved when associated sub-patterns are identical or complement each other, wherein the indicator patterns and their respective sub-patterns are disposed on top of one another, and wherein the upper indicator pattern has transparent portions which allow to view the indicator pattern that is disposed underneath.

An overlap of sub-patterns may also be achieved by having one of the indicator patterns disposed such that it is distributed over at least two indication plains whereas the other of the two indicator patterns is disposed in between these two indication plains.

The position indicating device is preferably used for indicating physical quantities, in particular time, velocity, content of a container, height or pressure or the like. In particular, it is anticipated to use the position indicating device for a timekeeping device such as a watch or a clock.

However, it is also possible to indicate quantities that are not immediately physical, such as star signs and ascendants, the status of tills, market prices and the like with the aid of the position indicating device.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

FIG. 2 shows an embodiment of a position indicating device according to the invention on a caliper gauge;

DETAILED DESCRIPTION OF EXEMPLARY EMBODIMENTS

Figure 1:
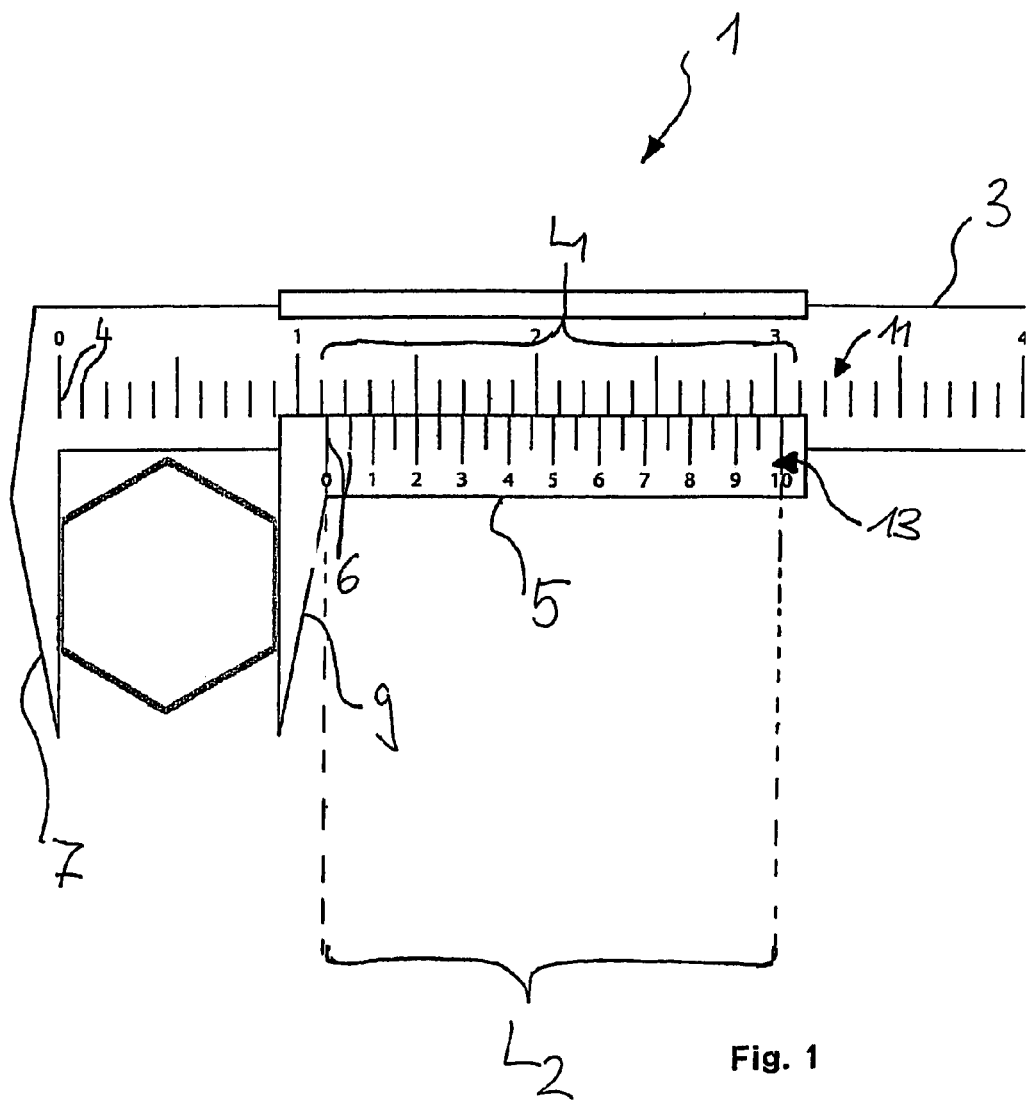
FIG. 1 shows a conventional position indicating device on a caliper gauge.

In the exemplary embodiments described below, components that are alike in function and structure are designated, as far as possible by alike reference numerals. Therefore, to understand the features of the individual components of a specific embodiment, the descriptions of other embodiments and of the summary of the invention should be referred to.

A first embodiment of the position indicating device according to the present invention is explained by way of example of a caliper gauge in FIGS. 2a to 2c. The caliper gauge 11 has a similar construction to the, caliper gauge depicted in FIG. 1, and comprises two components 13 and 15 that are movable in a linear fashion with respect to one another in the direction of extension 24. The first component 13 has a measuring leg 17 fixed thereto, and the second component 15 has a measuring leg 19 fixed thereto. The two measuring legs 17, 19 can be disposed so as to rest on an object 21 in order to determine the linear dimensions thereof by interpreting scales or indicator patterns 23 and 25, respectively, which are disposed on components 13 and 15, respectively. The indicator pattern 23 is directly disposed on component 13, and component 15 comprises a transparent plate 27 that is fixedly connected with component 15. The indicator pattern 25 is disposed on the transparent plate 27, which is disposed such that it overlaps indicator pattern 23 of component 13. On component 13, a plurality of indicator patterns 23 are arranged in succession with each indicator pattern 23 extending over a length $L_1$ of 10 mm. Each indicator pattern 23 is composed of $N_1=10$ identical partial patterns 29, which are arranged in a periodic order, i.e. are spaced at equal distances of 1 mm from one another in the direction of extension 24. The partial patterns 29 are each in the shape of a band, wherein each of the bands extends along a (notional) line 31, which line is oriented at an angle $\alpha<90°$ with respect to the direction of extension 24.

Indicator pattern 25 on transparent plate 27 comprises $N_2=10$ identical partial patterns 33 which are regularly spaced in the direction of extension 24, i.e. have equal distances of 0.9 mm from each other such that the indicator pattern 25, which is composed of the partial patterns 33, extends over a length $L_2=9$ mm.

Partial patterns 33 are also configured as markings having an elongated shape, which markings extend along (notional) straight lines 35, which straight lines are disposed at an angle $\beta<90°$ with respect to the direction of extension 24.

Since indicator pattern 25 is disposed on transparent plate 27, and transparent plate 27 overlaps component 13, indicator patterns 23 also overlap indicator pattern 25. In the situation depicted in FIG. 2a where both measuring legs 17, 19 are in contact with object 21, the dimension of object 21 can be deduced by observing the indicator patterns 23, 25. For this purpose, the user will view the partial pattern 33 of indicator pattern 25 that is designated by "0" and realize that it is disposed to the right of the partial pattern 29 of indicator pattern 23, which is designated by "1". This means that the dimension of object 21 is at least one full Millimeter. The user will further recognize that the partial pattern 33, which is designated by "8", of indicator pattern 25 intersects one of the partial patterns 29 of indicator pattern 23, which is why 8/10 mm are added to the dimension of object 21. Furthermore, the user will realize that the intersection 34 of the intersecting partial patterns 33, 29 is disposed approximately in a lower quarter of intersecting patterns 33, 29, which is why another 7.5 $\frac{1}{100}$ mm are added to the dimension of object 21. As a consequence, the measured dimension of object 21 is 1.875 mm.

Figure 3:
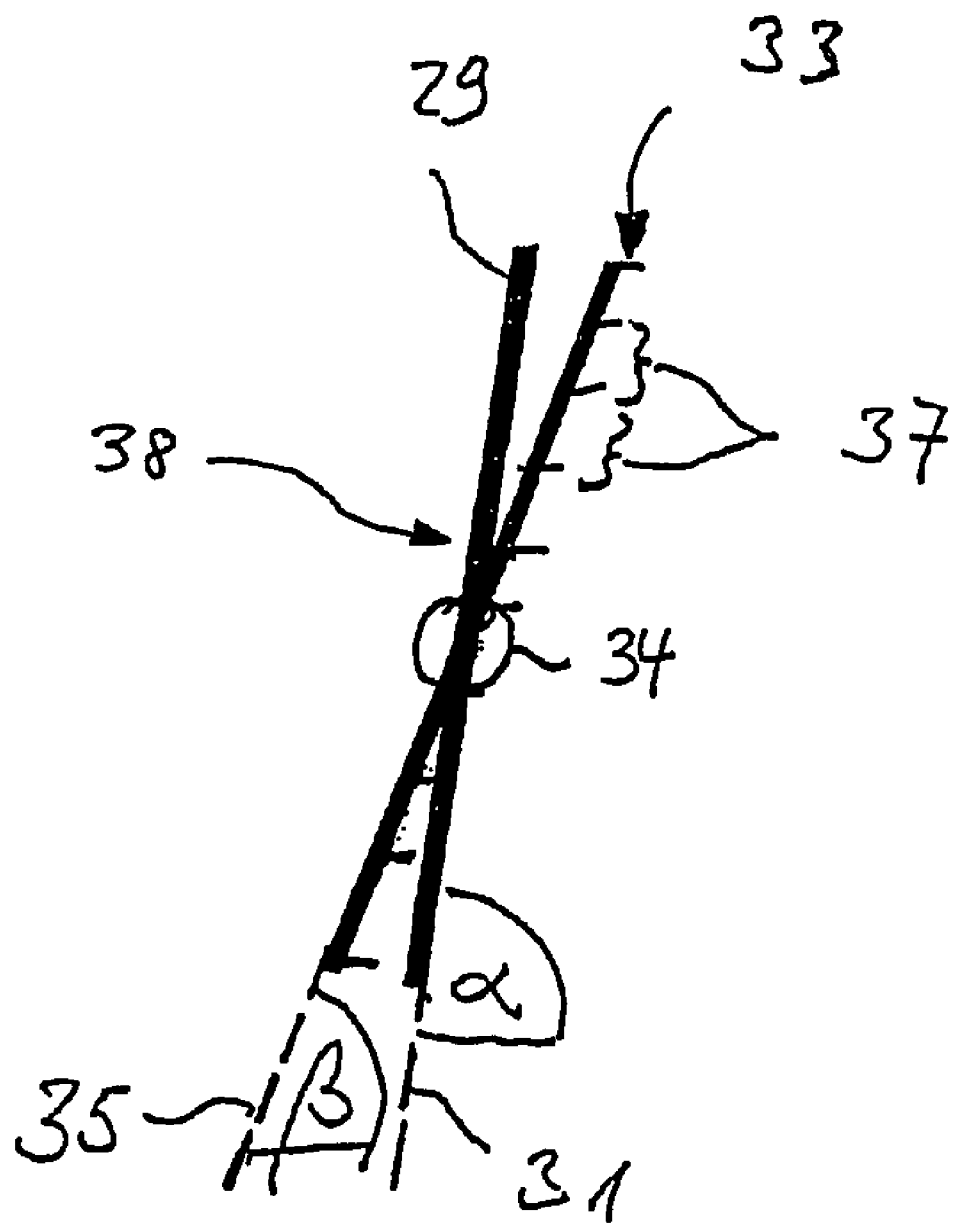
FIG. 3 shows a detailed view of a variation of the partial pattern of the FIG. 2.

In the above case, the reading of $\frac{1}{100}$ mm is carried out by estimating in which area along the partial patterns 33 and 29 they intersect. This estimation can be facilitated by having one of the partial patterns 33 and 29 divided into sub-patterns. This is illustrated in FIG. 3. In FIG. 3, partial pattern 33 has 10 sub-patterns 37, which are configured in the style of a scale comprising markings. In the situation depicted in FIG. 3, an intersection 34 can be identified and therefore 5 $\frac{1}{100}$ mm can be read. It is equally conceivable that partial pattern 29 comprises sub-patterns 38.

In comparison to the conventional Nonius scale described above in connection with FIG. 1, the indicator patterns shown in FIGS. 2 and 3 have additional indication features which enable a higher accuracy of reading than would be possible with the corresponding conventional Nonius scale. This is achieved by having the partial patterns 29 and 33 disposed along elongated straight lines 31,35, respectively, which are disposed at an angle $\alpha$ with respect to the direction of extension 24 for indicator pattern 23 on component 13, and which are disposed at an angle $\beta$, which is different from angle $\alpha$, with respect to the direction of extension 24 for indicator pattern 25 on the other component 15. For increasing the accuracy of reading, the intersection 34 of the partial patterns 33 and 29 is determined and the location thereof along the length of partial patterns 33, 29, estimated, or, alternatively, determined more accurately and objectively by counting the sub-patterns 37 according to FIG. 3.

Figure 4A:
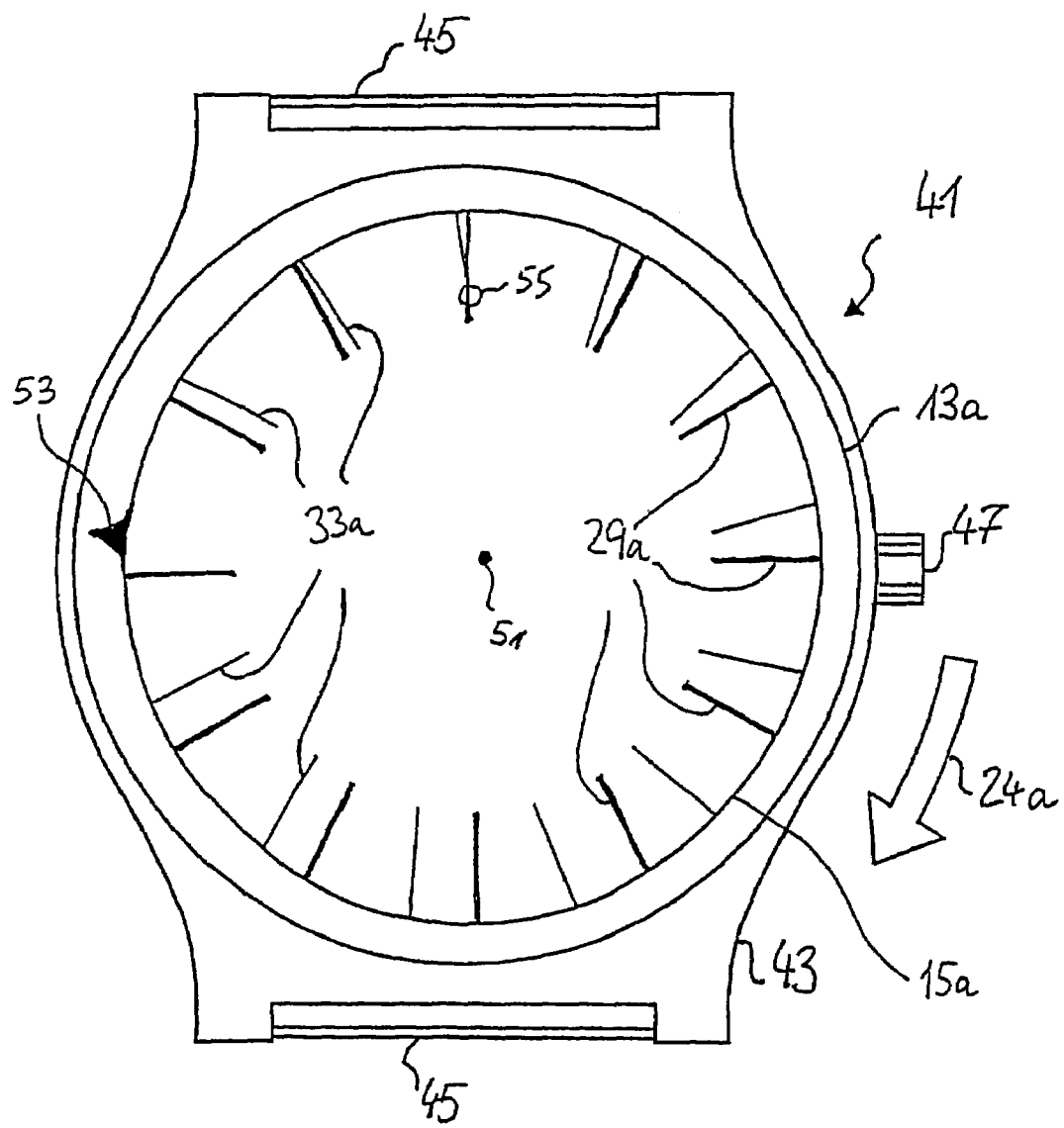
FIG. 4 shows a further embodiment of the position indicating device according to the present invention on a watch.
Figure 4B:
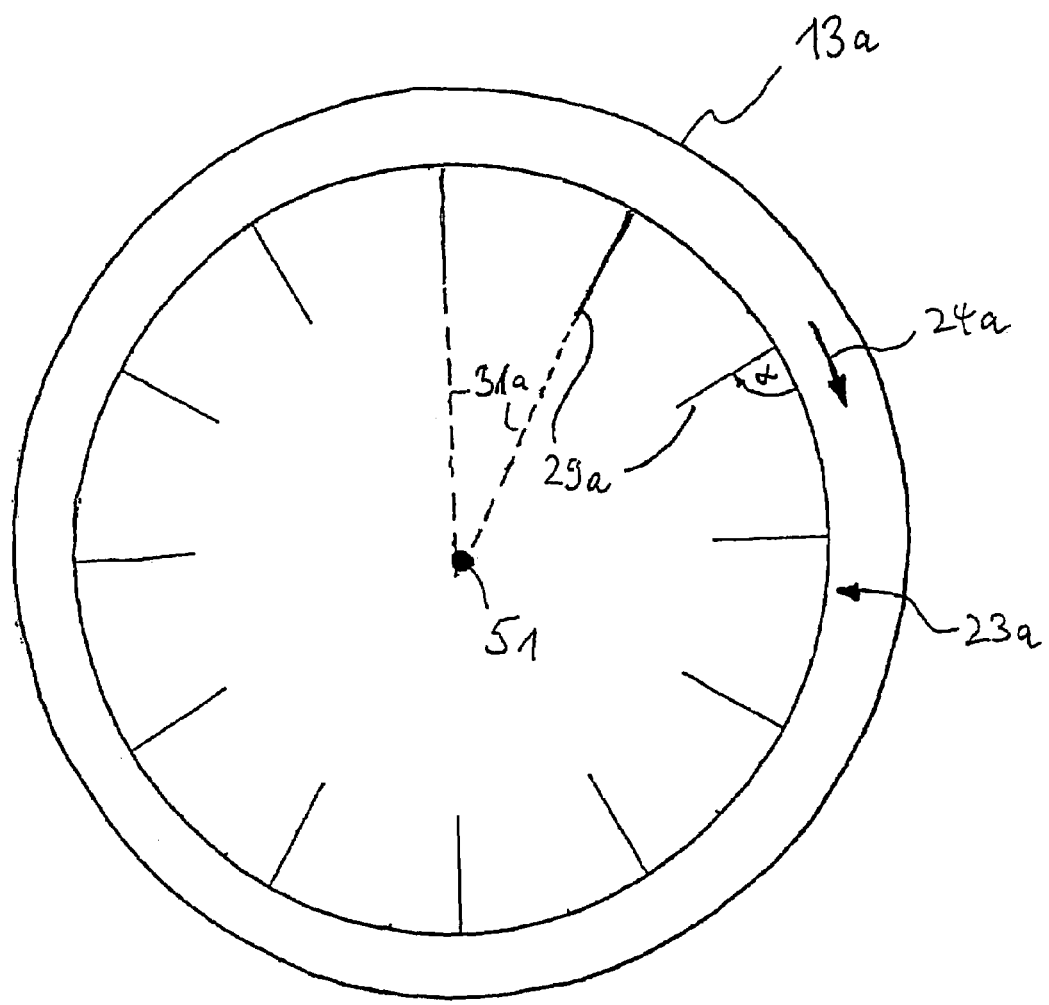
Figure 4C:
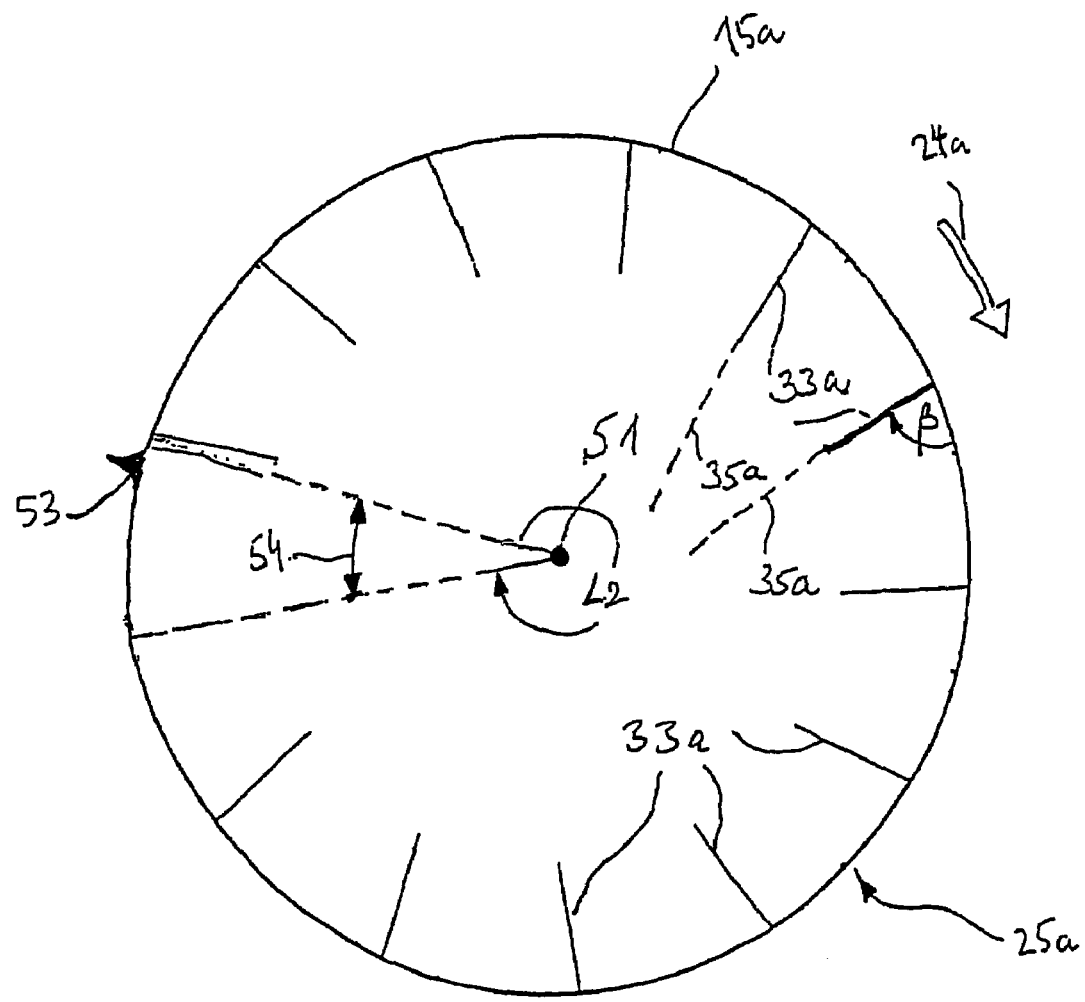

In the embodiment depicted, in FIGS. 2 and 3, the two components that are displaceable relative to one another are linearly displaceable. FIGS. 4a, 4b, and 4c show the indication principle explained with reference to FIGS. 2 and 3 being applied to two components that are rotatable relative to one another, such that they provide an indicating device for a watch 41. The watch comprises a housing 43 with pins 45 for fixing a wristband and an adjusting knob 47. A transparent watchglass 13a constitutes a first component of the position indicating device, and has an indicator pattern 23a thereon, whereas a second component of the indicating device is provided by a disk 15a which has an indicator pattern 25a thereon. Disk 15a is mounted to housing 43 such that it is rotatable about an axis 51. In the housing, a watchwork (not depicted in FIG. 4a) is provided for driving disk 15a about the axis 51 at such a uniform speed that disk 15a carries out a full revolution relative to the housing 43 about the axis 51 in a clockwise direction once every 12 hours.

Indicator pattern 23a, as depicted in FIG. 4b, comprises $N_1=12$ partial patterns 29a which are arranged along a direction of circumference 24a with respect to rotational axis 51 in a periodic order over an angle at circumference $L_1=360°$, i.e. the full circumference of the circle. Correspondingly, the circumferential distance between adjacent partial patterns 29a is 30°. The individual partial patterns 29a each extend along straight lines 31, which each intersect axis 51. This means that the straight lines 30a are oriented at an angle $\alpha=90°$ in the direction of extension 24a of indicator pattern 23a.

Indicator pattern 25a, as depicted in FIG. 4c, comprises $N_1=12$ partial patterns 33a which are arranged in a periodic order within a portion of the circumference $L_2=330°$ and accordingly have a distance in the direction of circumference 34a of 27.5° from one another. The partial patterns 33a each extend along straight lines 35a, which are each oriented at an angle β<90° in the direction of circumference 24.

Indicator pattern 25a is supplemented by a separate marking 53, which is disposed within a region of a portion of the circumference 54 disposed outside the portion of the circumference $L_2$ in which indicator pattern 25a with its partial patterns 33a is disposed. Marking 53 serves as an hour hand of watch 41.

The method for reading the watch depicted in FIG. 4 is as follows: First, marking 53 is localized and the full hour can be deduced from the orientation thereof about the rotational axis 51. In the depicted embodiment it is therefore shortly past 9:00. Subsequently, that partial pattern 33a of indicator pattern 25a is determined, which overlaps with a partial pattern 29a of indicator pattern 33a. In FIG. 4, this is the case for partial pattern 33a, which is disposed at the top below pin 45. An intersection, i.e. the overlap of both partial patterns 29a and 33a is denoted by 55 in FIG. 4a. Then, starting from marking 53 in a clockwise direction, the number of partial patterns 33a is determined which are located in between marking 53 and intersection 55. In FIG. 2a that number of partial patterns 33a is two. This means that at 9:00 five full minutes have to be added twice. Intersection 55 of the two partial patterns 33a and 29a is disposed, as seen from radially inwards, in the first $\frac{1}{5}^{th}$ of the length of partial patterns 33a, 29a, respectively. Correspondingly, the location of this overlap indicates one minute. The time indicated is therefore nine o'clock plus twice five minutes plus one minute, i.e. nine o'clock plus eleven minutes or 9:11.

Figure 5B:
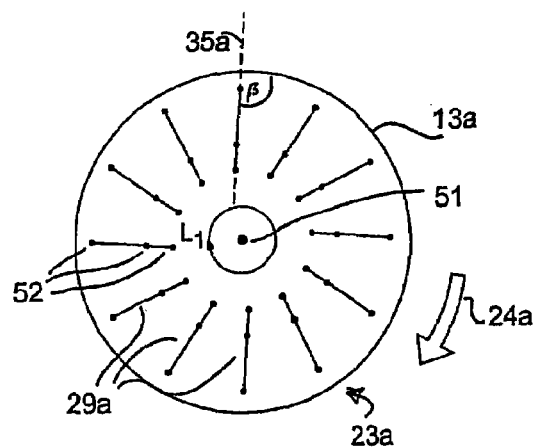
FIG. 5.
Figure 5C:
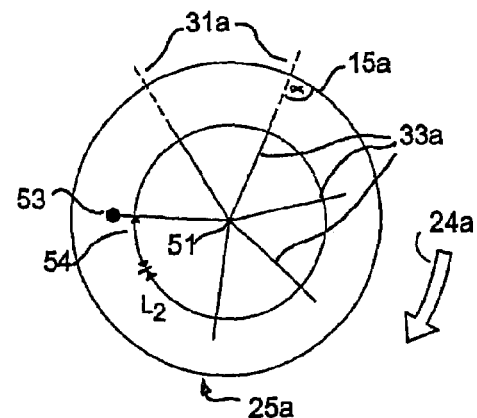

FIG. 5 shows another embodiment of an indicating device for a watch 41, which is similar to the embodiment depicted in FIG. 4. Like components are denoted by the same reference signs.

The difference to the position indicating device shown in FIG. 4 is that out of the $N_2$=12 partial patterns 33a of indicator pattern 25a, which partial patterns are periodically arranged over an angle at circumference of $L_2$=330°, as depicted in FIG. 4c, every second partial pattern 33a has been removed. Correspondingly, a circumferential distance between adjacent partial patterns 33a is 55°. Each of the individual partial patterns 33a extends along one of straight lines 31a, which each intersect axis 51. Again, a marking 53 serves as the hour hand of watch 41, which marking 53 is disposed adjacent to that end of partial pattern 33a, which is disposed on the circumference of the circle, which is adjacent to part annular area 54.

In correspondence to indicator pattern 23a as shown in FIG. 4, indicator pattern 23a depicted in FIG. 5 comprises $N_1$=12 partial patterns 29a, which are distributed along the direction of circumference 24a with respect to rotational axis 51 in a periodic manner over the angle at (circular) circumference of $L_1$=360°. Correspondingly, a circumferential distance between adjacent partial patterns 29a is 30°. The individual partial patterns 29a extend along straight lines 35a which are each disposed at an angle β<90° with respect to the direction of circumference 24a.

The method for reading the watch depicted in FIG. 5a corresponds substantially to the method of reading as described with reference to FIG. 4a. It is, however, different by virtue of the length of each partial pattern 29a corresponding to a period of ten minutes (in contrast to FIG. 4a wherein each partial pattern 29a corresponds to a period of five minutes). Each partial pattern 29a is provided with markings 52 which divide each partial pattern 29a into two portions of five minutes each. In the same manner as in the embodiment described above with reference to FIG. 4a, the minutes are read at intersection 55 of the partial pattern 29a and partial pattern 33a in the embodiments depicted in FIG. 5a.

Figure 5A:
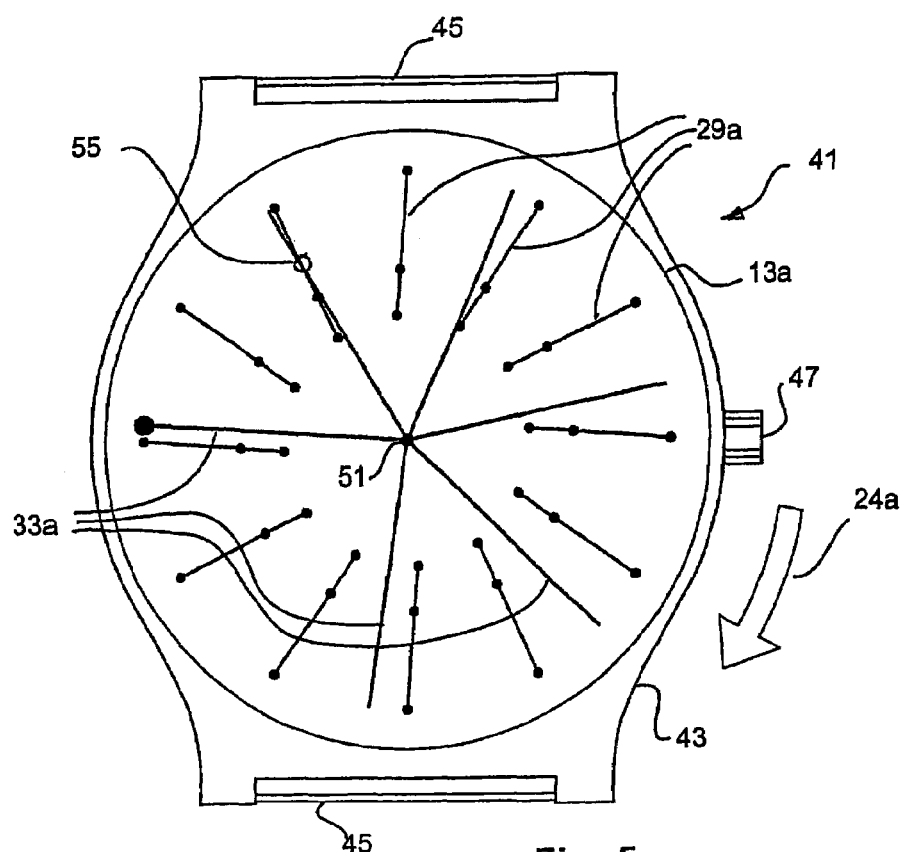

In the embodiments depicted in FIG. 5a, it is therefore nine o'clock and about 7 minutes.

Compared to the embodiment shown in FIG. 4, the accuracy of reading is slightly lower (10 minutes as opposed to five minutes distributed over a partial pattern 29a), but the reading itself is slightly more convenient.

In order to enable a more accurate reading, it is further anticipated to subdivide at least one of partial patterns 29a, 33a further into sub-patterns, and, in particular, even further than already illustrated in FIG. 5 (two sub-patterns). This division into sub-patterns is schematically shown in FIGS. 6a, 6b, 6c, 6d, and 6e.

Figure 6A:
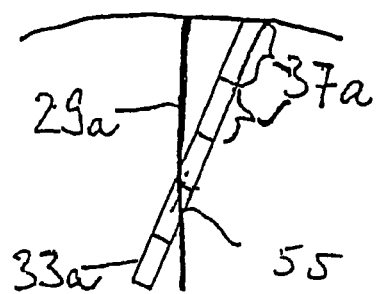
FIG. 6 show detailed views of variations of the partial patterns of FIG. 4.

In FIG. 6a, each partial pattern 33a is divided into five sub-patterns 37a in order to facilitate the reading of the minutes.

Figure 6B:
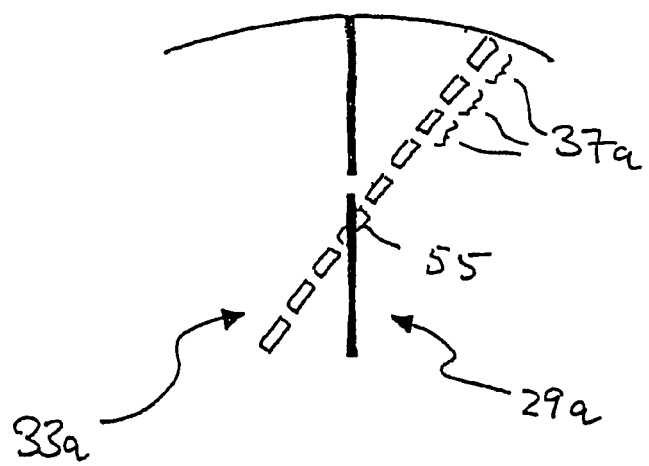
Figure 6C:
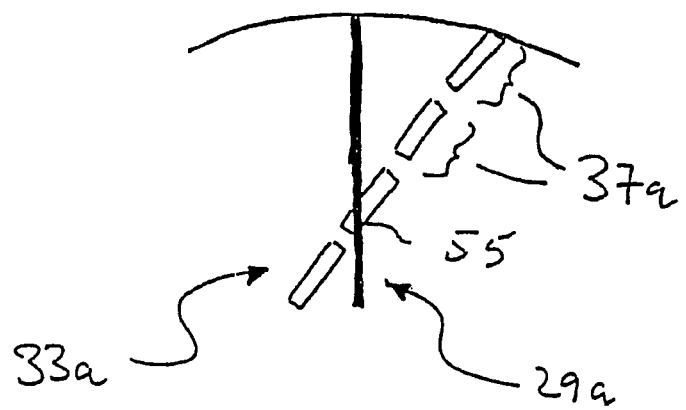

As shown in FIG. 6b, the partial patterns 33a may also be divided into more than five sub-patterns, that is to say nine sub-patterns 37a that are separate from one another, or, as illustrated in FIG. 6c, into a maximum of four sub-patterns 37a that are separate from one another, wherein the configuration (or shape) of each of the sub-patterns 37a is a substantially continuous configuration (shape). Analogous considerations also apply to partial pattern 29a.

Figure 6D:
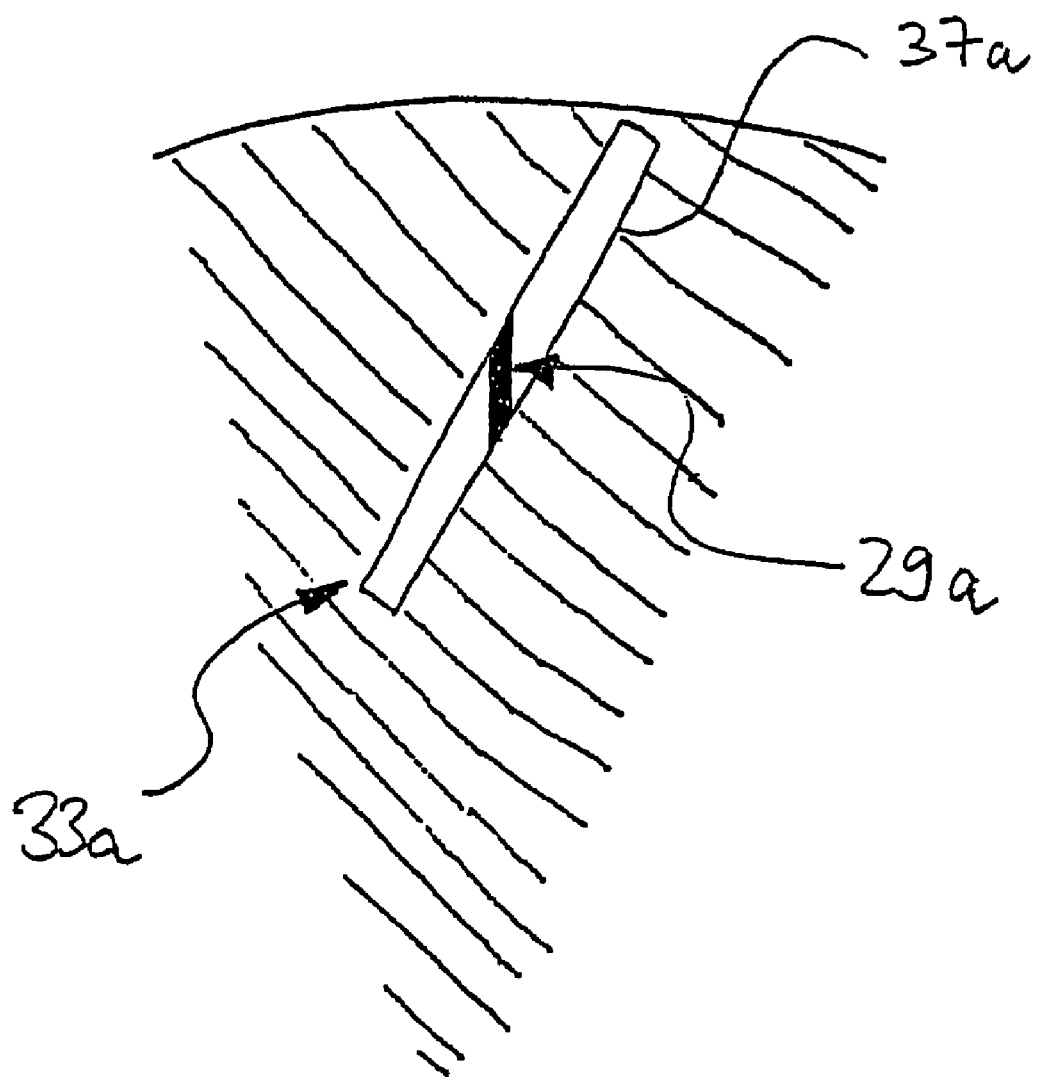

As shown in FIG. 6d, partial patterns 33a can also comprise at least one transparent portion each, which corresponds exactly to a sub-pattern 37a in the depicted embodiment, which transparent portion is provided within a substantially non-transparent surrounding.

Figure 6E:
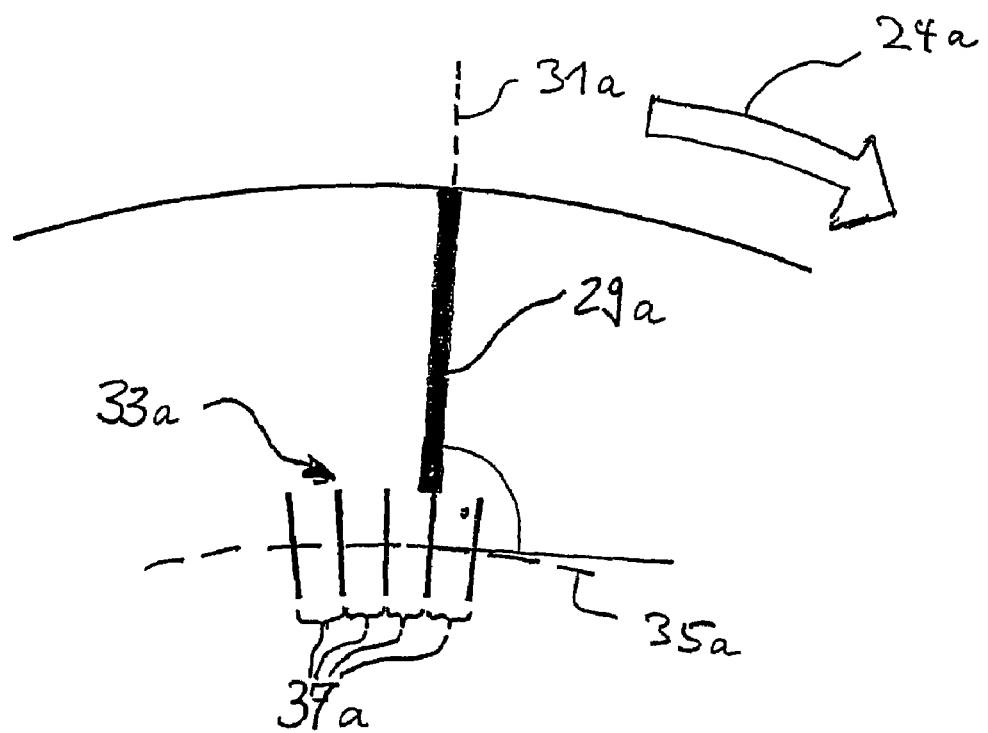

FIG. 6e shows an embodiment wherein the first partial pattern 29a extends along straight line 31a, i.e. orthogonally with respect to the direction of extension 24a, and the second partial pattern 33a with sub-patterns 37a extends along line 35a, which is orthogonal to line 31a.

Figure 7B:
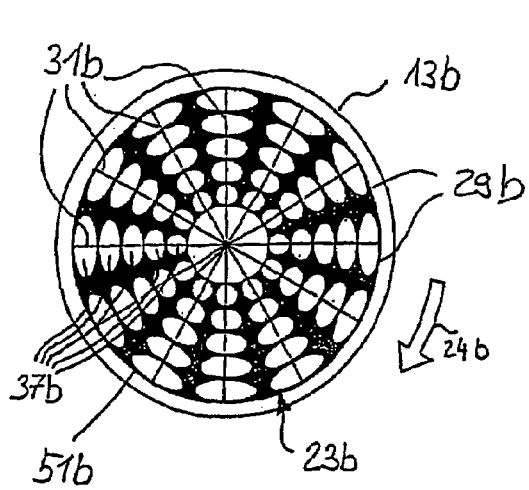
FIG. 7 shows a further embodiment of the position indicating device according to the present invention on a watch.
Figure 7C:
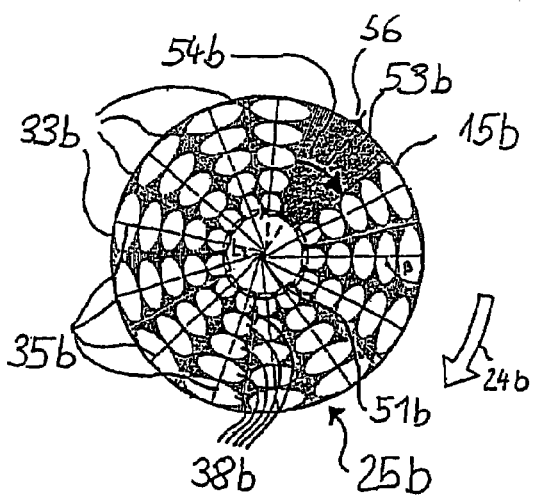
Figure 7A:
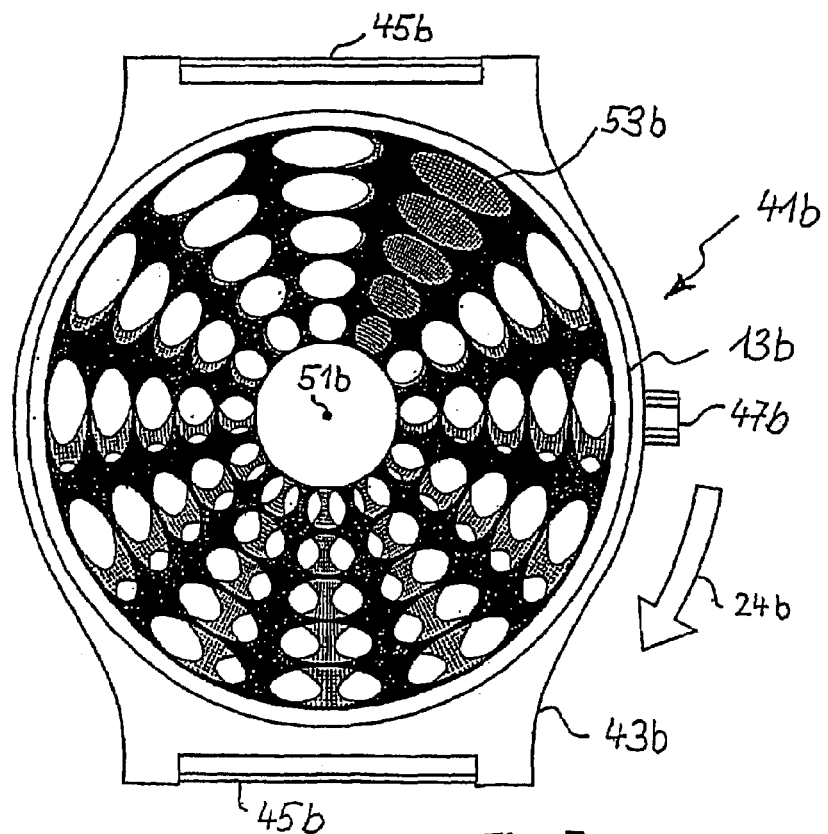

FIG. 7 illustrates another embodiment for an indicating device for a watch 41b. The watch, again, comprises a housing 43b with pins 45b for attaching a wristband and an adjusting knob 47b. A transparent watchglass 13b constitutes a first component of the position indicating device and bears an indicator pattern 23b, whereas a second component of the position indicating device is provided by disk 15b which bears an indicator pattern 25b. Disk 15b is mounted to housing 43b such that it is rotatable about an axis 51b. FIG. 7a does not show that a watchwork is provided in the housing, which drives disk 15b about the axis 51b at such a uniform speed that it carries out one full revolution relative to the housing 43b about axis 51b in a clockwise direction in a period of twelve hours.

Indicator pattern 23b, as depicted in FIG. 7a, comprises $N_1$=12 partial patterns 29b, which are arranged along a direction of circumference 24b with respect to the rotational axis 51b in a periodic manner over an angle at circumference of $L_1$=360°, i.e. the full circumference of a circle. Correspondingly, a circumferential distance between adjacent partial patterns 29b is 30°. The individual partial patterns 29b each extend along straight lines 31b wherein each of the straight lines 31b intersects axis 51b.

Each partial pattern 29b comprises five sub-patterns 37b, which are configured to have an oval shape, as shown in FIG. 7b. The sub-patterns 37b are disposed on the watchglass 13b (for instance by application of a colorant), or may be provided as apertures and/or transparent portions in the watchglass 13b. The sub-patterns 37b of each partial pattern 29b are disposed such that their geometric centers of gravity are disposed along the straight lines 31b. The sub-patterns 37b are identical in the direction of circumference 24b, but may have different shapes or configurations transversely to the direction of circumference. The centers of gravity of the sub-patterns merely constitute a reference point of the respective partial pattern for the purpose of their arrangement along the straight lines $31b$. However, other points within these sub-patterns that are different from the centers of gravity may be used as reference points instead.

Indicator pattern $25b$ comprises $N_2=12$ partial patterns $33b$, which are disposed in a periodic manner within a portion of the circumference $L_2=330°$ and thus have a distance of $27.5°$ from each other in the direction of circumference $24b$. Each partial pattern $33b$ extends along one of straight lines $35b$, which are oriented at an angle $\beta<90$ with respect to the direction of circumference $24b$ such that they do not intersect rotational axis $51b$, but extend closely past the rotational axis $51b$.

Each partial pattern $33b$ comprises five sub-patterns $38b$, which are disposed on component $50b$, which may be provided in the form of a disk, for instance. The sub-patterns $38b$ are provided in the form of apertures or transparent portions within the disk and have configurations that are, in the direction of circumference $24b$, identical to those of the sub-patterns $37b$. The sub-patterns $38b$ of each partial pattern $33b$ are disposed such that their geometric centers of gravity are disposed along straight lines $35b$, wherein the straight lines $35b$ are disposed at an angle $\beta$ with respect to the direction of circumference $24b$.

Indicator pattern $25b$ is supplemented by a portion $53b$, which is disposed in a part annular area $54b$, which is situated outside of part annular area $L_2$ in which indicator pattern $25b$ and its partial patterns $33b$ are located. The portion $53b$ serves as the hour hand of watch $41b$.

The method of reading watch $41b$, as shown in FIG. $7a$, is as follows: first, the portion $53b$ is localized and the full hour deduced from the orientation thereof about the rotational axis $51b$.

In order to facilitate reading, an additional marking $56$ could be disposed on portion $53b$, which marking would be adjacent to an end of straight line $35b$ of area $53b$, the end being located on the circumference.

In the embodiment illustrated in FIG. $7a$ it is therefore shortly before one o'clock, i.e. twelve full hours are indicated.

Since the disk $15b$ rotates in a clockwise direction and since the watchglass $13b$ is in a fixed position, the sub-patterns $38b$ appear one after the other within the sub-patterns $37b$. There are positions of the two components $13b$ and $15b$ relative to one another in which exactly one sub-pattern $37b$ and exactly one sub-pattern $38b$ are in registry in a substantially exact or particularly precise manner. The temporal distance between two of such subsequent positions corresponds exactly to one minute. As a rule for reading the minutes, the following applies: the number of minutes past a full hour, the hour being indicated by portion $53b$, corresponds to the number of positions at which sub-patterns $37b$ and $38b$ were in exact registry. The first minute is indicated by that sub-pattern $38b$ which is disposed in the first partial pattern $33a$ to follow portion $53b$ in the direction of circumference $24b$, and closest to axis $51b$. The second minute is indicated by the sub-pattern $38b$ of the same partial pattern $33b$ that follows the sub-pattern indicating the first minute in a radially outward direction, and so on. The sixth minute is indicated by the sub-pattern $38b$ disposed closest to the axis $51b$ of the second partial pattern $33b$ in the direction of circumference $24b$ and so on.

In the embodiment illustrated in FIG. $7a$, the fifty-sixth minute of the twelfth hour is indicated, i.e. 12:56.

Figure 8B:
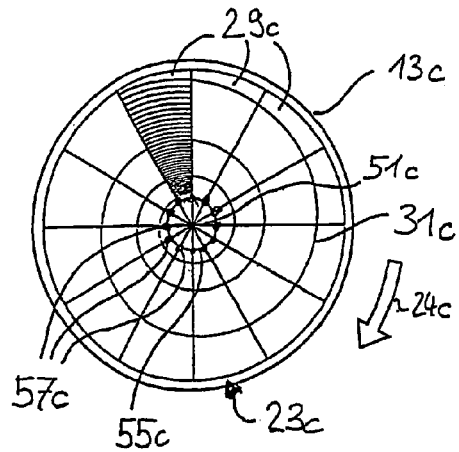
FIGS. 8 to 16 each show further embodiments of the position indicating device according to the present invention on a watch.
Figure 8C:
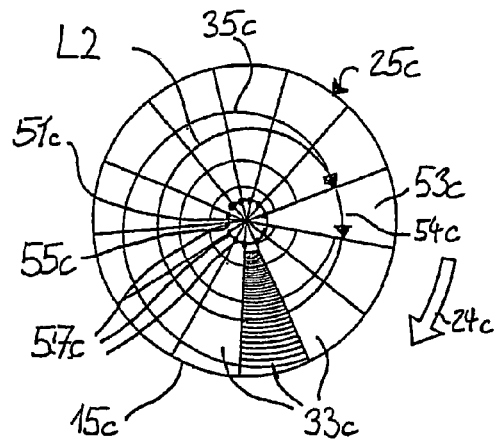
Figure 8A:
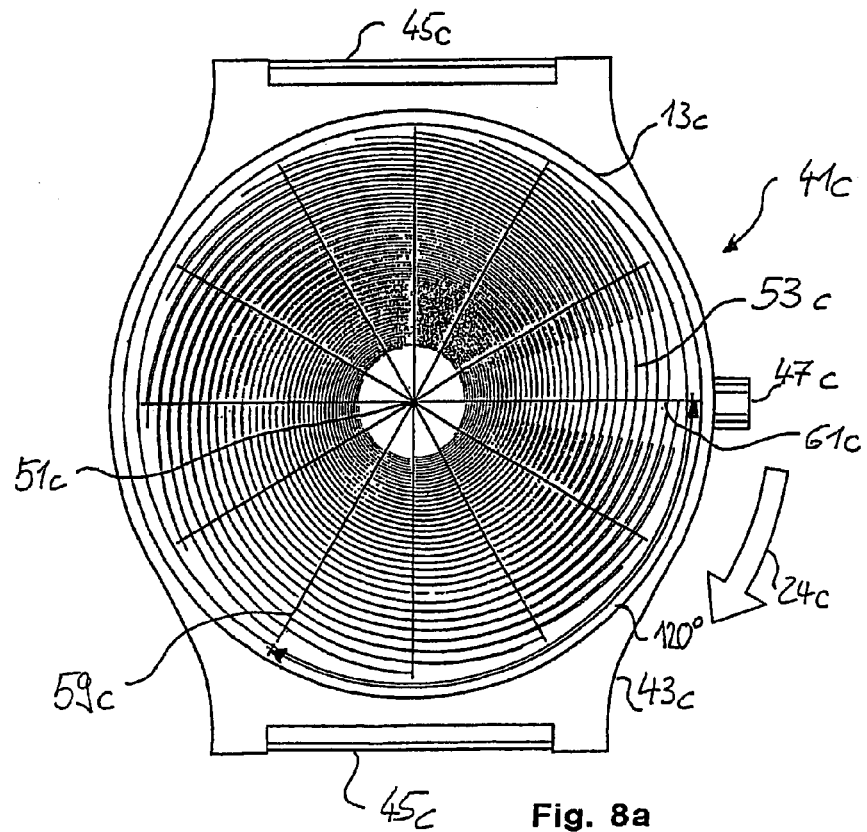

FIG. 8 shows a further embodiment of the present invention, the construction of which substantially corresponds to the embodiment illustrated in FIG. 4. The same reference signs denote the same components.

Partial patterns $29c$ are disposed along lines $31c$ which extend from points $57c$ radially outwards in the shape of spirals about the axis $51c$ in a direction opposite to the direction of circumference $24c$, with points $57c$ being disposed at distances of $30°$ on a full circumference of circle $55c$. The lines of partial patterns $29c$ are each subject to the same mathematical description of a spiral, in particular for a logarithmic spiral having several windings.

For the sake of simplicity, in FIG. $8b$, only in one sector of indicator pattern $23c$ all lines $31c$ are shown, whereas in the other sectors only one of the lines $31c$ is shown.

Partial patterns $33c$ are disposed along lines $35c$, which extend from points $57c$, which points are disposed at distances of $27.5°$, in a spiral manner about the axis $51c$, in a direction opposite to the direction of circumference $24c$, radially outwards. The lines of partial patterns 33 are each subject to the same mathematical description of a spiral, in particular for a logarithmic spiral having several windings, wherein the lines of partial patterns $33c$ each have the same number of windings and the same outer radius at the ends as the lines of partial patterns $29c$.

A portion $53c$, which again serves as the hour hand, covers a section of $30°$ and somewhat interrupts the spiral course of partial patterns $33c$ about the axis $51c$ in a direction opposite to the direction of circumference $24c$.

In FIG. $8c$, for the sake of simplicity, only in one sector all of the lines $35c$ are shown, whereas in the other sectors only one of the spiral lines $35c$ is shown.

The method of reading the hours corresponds to the method of reading described in connection with FIG. 4.

The following applies to a rule for reading the minutes, which are read in a direction of rotation, i.e. in this case in a clockwise direction: the area in which partial patterns $31c$ are in registry with partial patterns $33c$, or in which they intersect, respectively, is identified. If one thinks of these points of intersection as linked, a line exists that extends radially outwards from axis $51c$ as shown in FIG. $8a$ and denoted by $59c$. The angle between this line $51c$ and a line $61c$ that also extends through axis $51c$, over which portion $53c$ is just moving and which would be disposed in analogy to the hour hands of a conventional analogue watch, corresponds to the minutes past of the hour. Applied to the embodiment illustrated in FIG. $8a$, this means: Portion $53c$ moves over line $61c$, which represents the "3 o'clock"- or "15 minutes"-marking of a conventional analogue watch, and the intersections of partial patterns $31c$ and $33c$ extend along the line $59c$ which represents the "7 o'clock" or "35 minutes"-marking of a conventional analogue watch so that the angle in between is about $120°$, i.e. in a style of a conventional analogue watch about 20 minutes have passed, since $6°$ correspond to 1 minute. In FIG. $8a$, the time indicated is 3 hours and about 20 minutes, i.e. 20 minutes past 3 o'clock.

Figure 9B:
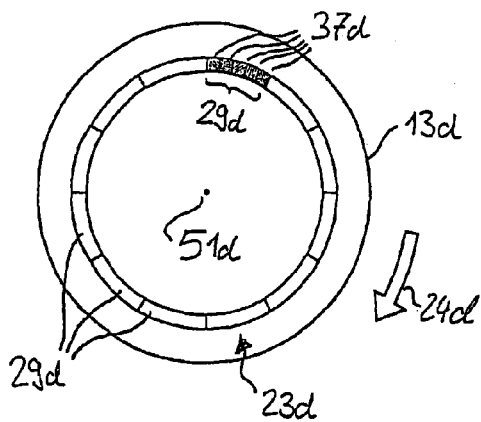
Figure 9C:
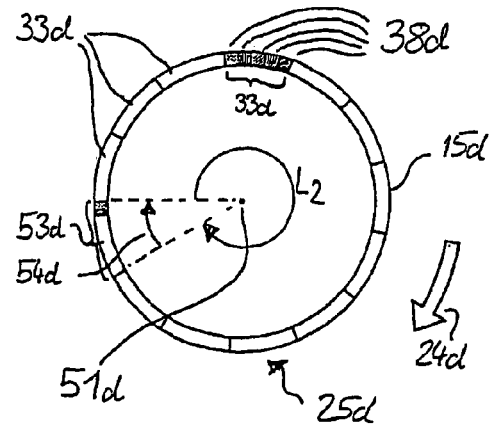
Figure 9A:
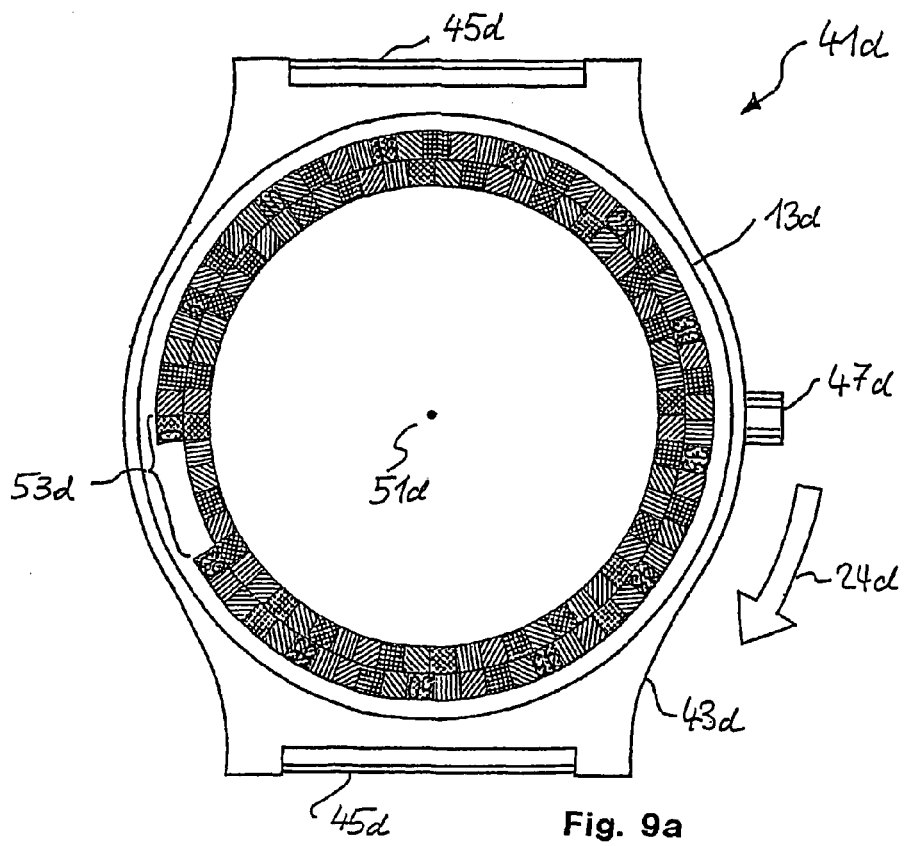

In FIG. 9, a further embodiment is illustrated, the construction of which essentially corresponds to the embodiment shown in FIG. 4. Like components are denoted by the same reference signs.

Partial patterns $29d$ are divided into 5 sub-patterns $37d$ each, and partial-patterns $33d$ are divided into 5 sub-patterns $38d$ each. Sub-patterns $37d$ and $38d$ of a partial pattern $29d$, $33d$ differ from each other in that no like pairs of sub-patterns are formed. This difference can, for instance, be achieved by virtue of a gradation in brightness, shade of colour, saturation of colour, texture, or the like. The 12 partial patterns $29d$ or 33*d*, respectively, of the respective components 23*d*, 25*d* are identical, i.e. the sub-patterns 37*d*, 38*d* in each partial pattern 29*d*, 33*d* of a component are disposed in the same order in the direction of circumference 24*d*. Likewise, the partial patterns 29*d*, 33*d* of both components are identical in terms of the order (sequence) and structure of their sub-patterns 37*d*, 38*d*. In the embodiment shown in FIG. 9, the sub-patterns 37*d*, 38*d* are indicated by 5 differently hatched areas.

The method of reading the hours corresponds to the method of reading-described with reference to FIG. 4. In the example shown in FIG. 9, it is therefore about 9 o'clock.

As a result, the following applies to the reading the minutes: Starting from portion 53*d* in the direction of circumference 24*d*, those two sub-patterns 37*d*, 38*d* are identified, which have the same configuration (brightness, shade of colour, saturation of colour, texture, etc.) and which are the most likely to more or less exactly face each-other, i.e. match or be aligned with another. The number of sub-patterns 38*d* that are, in the direction of circumference 24*d*, disposed between the portion 53*d* and the pair of sub-patterns 37*d* and 38*d* that more or less exactly face each other, i.e. match, corresponds to the number of minutes that have passed. As a reading aid for the minutes, the numerals 0, 5, 10, 15, etc. may be displayed starting from the first sub-pattern 38*d* following the portion 53*d* in the direction of circumference 24*d* and then at intervals of 5 sub-patterns 38*d*. In the embodiment shown in FIG. 9*a*, the time 9 o'clock and 0 minutes is therefore illustrated.

In FIG. 10, a further embodiment is shown, the construction of which substantially corresponds to that of the embodiment in FIG. 4. The same reference signs were used for the same components.

Figure 10B:
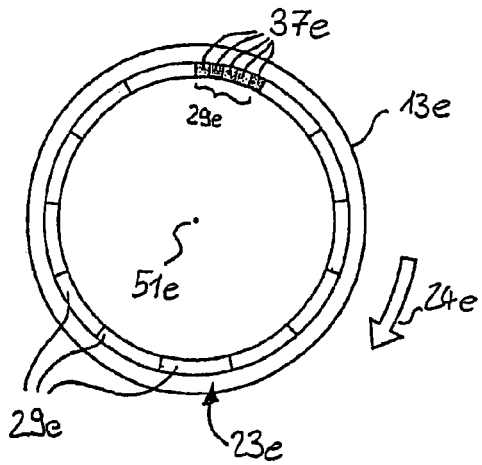

An indicator pattern 23*e* in FIG. 10*b* comprises $N_1=13$ identical partial patterns which are distributed along a direction of circumference 24*e* with respect to the rotational axis 51*e* in a periodic manner over an angle at circumference $L_1=360°$, i.e. the full circumference of the circle. Correspondingly, a circumferential distance between the adjacent partial patterns 29*e* is 27.69°.

Figure 10C:
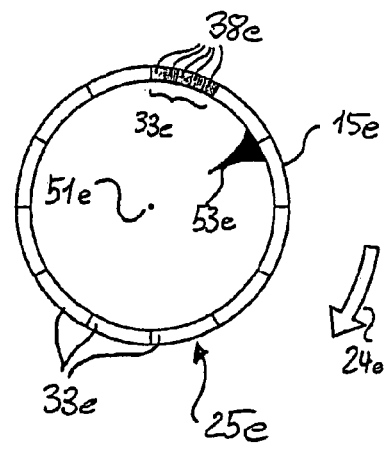

An indicator pattern 25*e* in FIG. 10*c* comprises $N_2=12$ identical partial patterns which are distributed along a direction of circumference 24*e* with respect to the rotational axis 51*e* in a periodic manner over an angle at circumference $L_2=360°$, i.e. the full circumference of the circle. Correspondingly, a circumferential distance between adjacent partial patterns 33*e* is about 30°.

Disk 15*e* is provided with a marking 53*e* which serves as the hour hand of watch 41*e*.

Figure 10A:
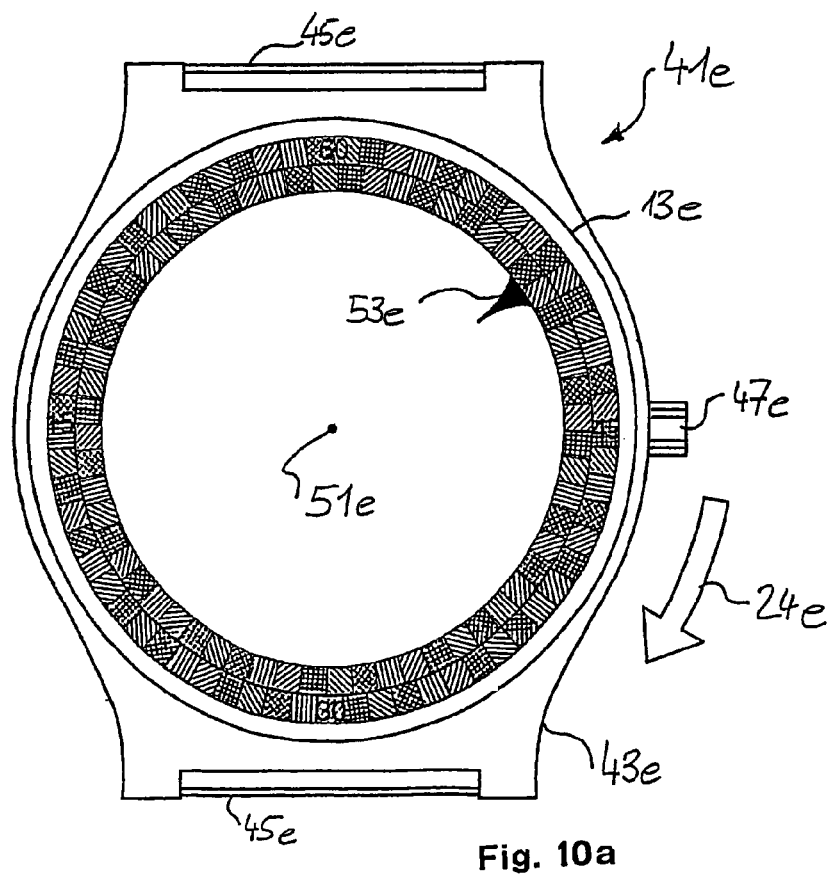

The method-of reading the watch-as shown in FIG. 10*a* is as follows: first, the marking 53*e* is identified and the full hour deduced from the orientation thereof about the rotational axis 51*e*. In the depicted example, it is therefore shortly before 2 o'clock.

As a rule for reading the minutes, the following applies: those two sub-patterns 37*e* and 38*e* are identified which have the same configuration (brightness, shade of colour, saturation of colour, texture, etc.) and are the most likely to more or less exactly face each other, i.e. match. The number of sub-patterns 38*e* that are, in the direction opposite to the direction of circumference 24*e*, disposed between the vertex of the indicator pattern 25*e* and the pair of more or less exactly facing sub-patterns 37*e* and 38*e* corresponds to the number of minutes that have passed. In the embodiments shown in FIG. 10*a*, the time 1 hour and about 50 minutes, or 50 minutes past 1 o'clock, is therefore indicated.

FIG. 11 shows a further embodiment, the construction of which substantially corresponds to that of the embodiment shown in FIG. 10. The same reference signs are used for the same components.

Figure 11B:
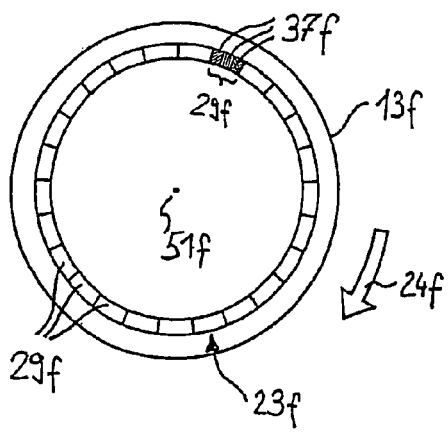

The indicator pattern 23*f* in FIG. 11*b* comprises $N_1=25$ identical partial patterns which are arranged along a direction of circumference 24*f* with respect to the rotational axis 51*f* in a periodic manner over an angle at circumference. $L_1=360°$, i.e. the full circumference of the circle. Correspondingly, a circumferential distance between adjacent partial patterns 29*f* is 14.4°.

Figure 11C:
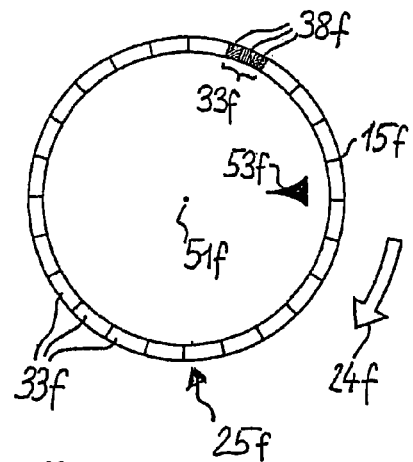

The indicator pattern 25*f* in FIG. 11*c* comprises $N_2=24$ identical partial patterns which are distributed along a direction of circumference 24*f* with respect to the rotational axis 51*f* in a periodic manner over an angle at circumference $L_2=360°$, i.e. the full circumference of the circle. Correspondingly, a circumferential distance between adjacent partial patterns 33*f* is 15°.

Disk 15*f* is provided with a marking 53*f* which serves as the hour hand of watch 41*f*.

Figure 11A:
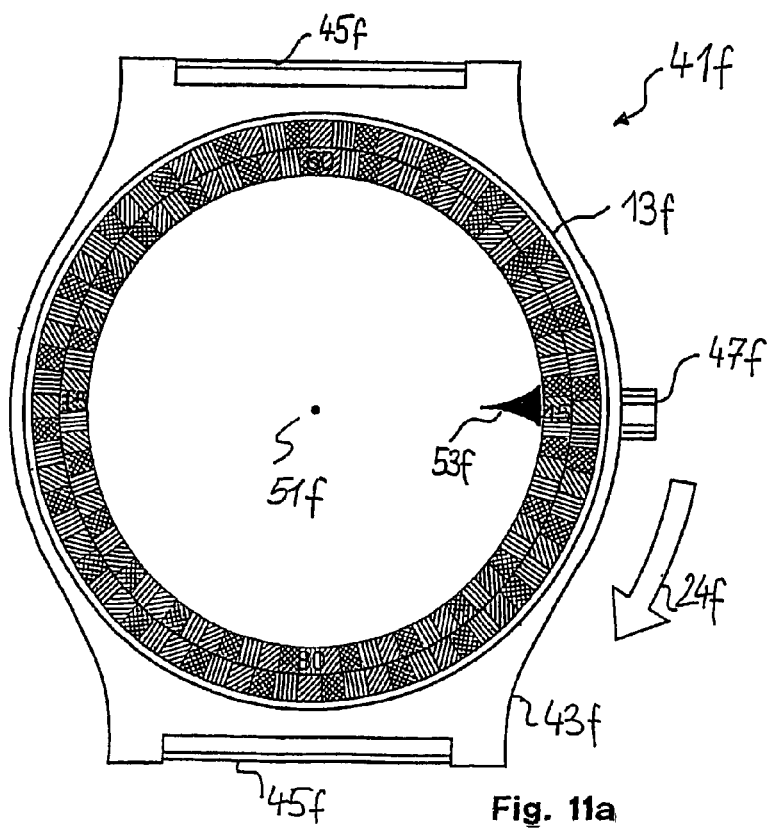

The method of reading the watch shown in FIG. 11*a* is as follows: first, marking 53*f* is localised and the full hour deduced from the orientation thereof about the rotational axis 51*f*. In the depicted example, it is therefore shortly before 3 o'clock.

As a rule for reading the minutes, the following applies: those two sub-patterns 37*f*, 38*f* are identified which have the same configuration (brightness, shade of colour, saturation of colour, texture, etc.) and, are the, most likely to more or less exactly face each other, i.e. match. The position of these two sub-patterns 37*f* and 38*f* corresponds to the position of a conventional minute hand which would, however, move in an anticlockwise direction. In the embodiment illustrated in FIG. 11, the time shown is 2 o'clock and about 50 minutes.

FIG. 11 shows a further preferred embodiment for an indicating device for a watch wherein only the indicator patterns 23*ff*, 25*ff* with their respective partial patterns 29*ff*, 33*ff* and sub-patterns 37*ff*, 38*ff* are shown. Otherwise, the construction of the watch is in analogy to the embodiments described above.

Figure 11D:
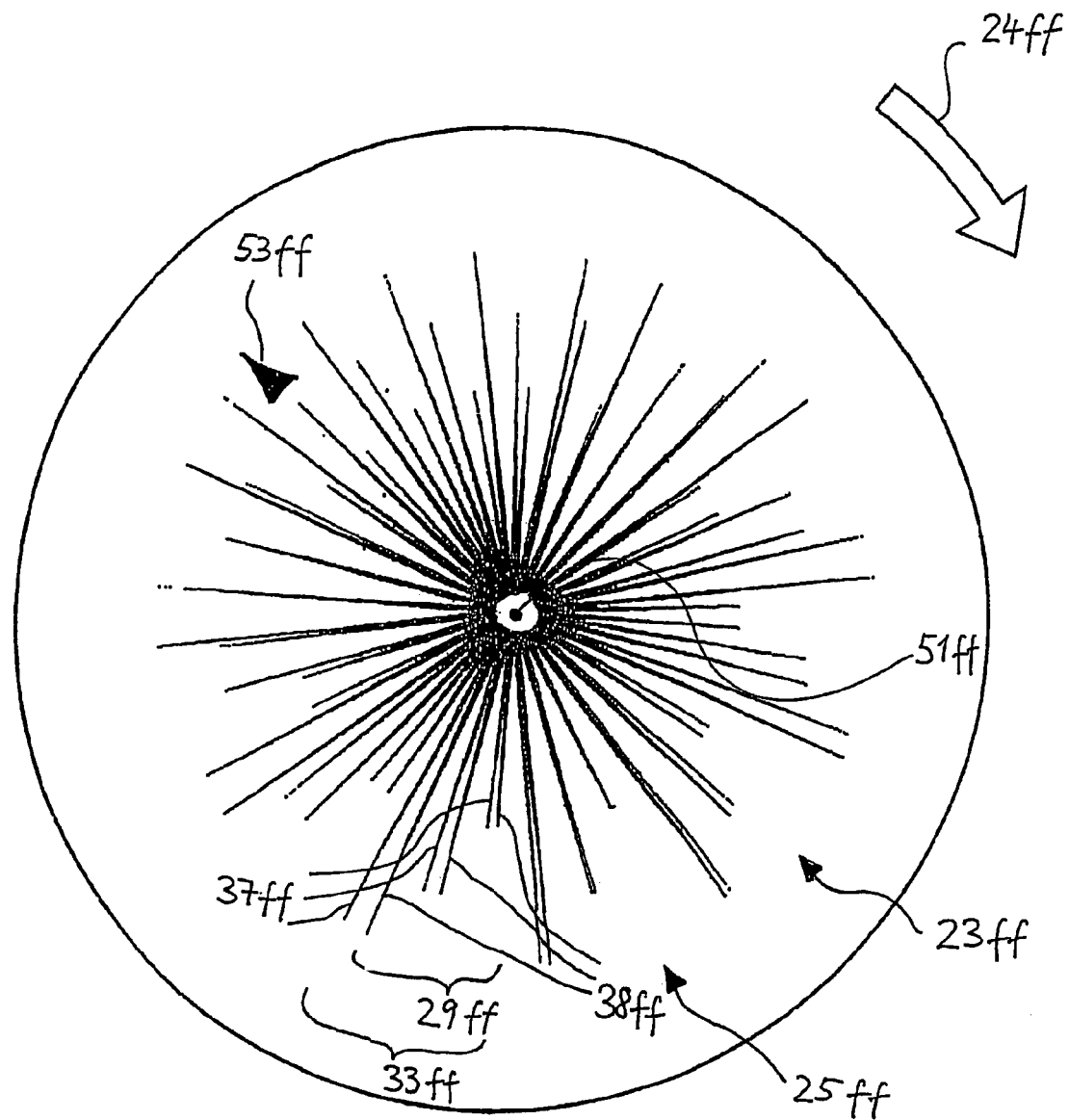

The indicator patterns 23*ff*, 25*ff* illustrated in FIG. 11*d* are similar to the indicator patterns 23*f*, 25*f* illustrated in FIGS. 11*b* and 11*c* in the sense that on each indicator pattern 23*ff*, 25*ff*, respectively, identical partial patterns 29*ff*, 33*ff*, respectively, are disposed adjacent to one another along a direction of circumference 24*ff*. $N_1=12$ identical partial patterns 29*ff* are disposed on the indicator pattern 23*ff*, which partial patterns are distributed along the direction of circumference 24*ff* with respect to a rotational axis 51*ff* in a periodic manner over an angle at circumference $L_1=360°$, i.e., the full circumference of the circle. $N_2=11$ identical partial patterns 33*ff* are disposed on the indicator pattern 25*ff* which partial patterns are distributed along the direction of circumference 24*ff* with respect to rotational axis 51*ff* in a periodic manner over an angle at circumference $L_2=360°$, i.e. again the full circumference of the circle.

The partial patterns 29*ff*, 33*ff* of the respective indicator patterns 23*ff*, 25*ff* are divided into three sub-patterns 37*ff*, 38*ff* each which are in the form of beams extending radially outwards from the rotational axis 51*ff*. The beams of a partial pattern 29*ff*, 33*ff* can have different lengths and the same configuration or they may have the same length and different configurations. The difference in the configurations may be achieved, for instance, by virtue of a gradation in brightness, shade of colour, saturation of colour, texture and the like.

The partial patterns 29*ff*, 33*ff* of both indicator patterns 23*ff*, 25*ff* are identical in terms of the sequence and configuration of sub-patterns 29ff, 33ff. In the embodiments shown in FIG. 11d, the beams of indicator pattern 23ff differ from the beams of indicator pattern 25ff by virtue of a different hatch.

For reading the hours, marking 53ff is localised and the full hour deduced from the orientation thereof about the rotational axis 51ff. In the depicted example, 10 hours are indicated.

For reading the minutes, that sub-pattern 37ff or that beam of the indicator pattern 25f, respectively, is identified which is just being covered to the greatest extent by a sub-pattern 38ff of the indicator pattern 23ff having the same length as the sub-pattern 37ff. The position of these two sub-patterns 37ff, 38ff or beams, respectively, corresponds to the position of a conventional minute hand. In the illustrated example, it is therefore 10 o'clock and about 25 minutes.

FIG. 12 shows a further embodiment, the construction of which substantially corresponds to that of the embodiment shown in FIG. 10. The same reference signs are used for the same components.

Figure 12B:
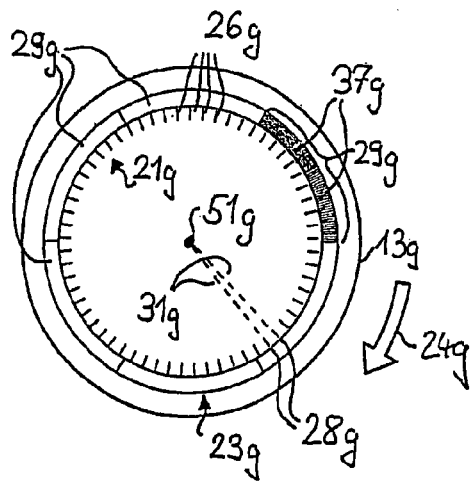
Figure 12C:
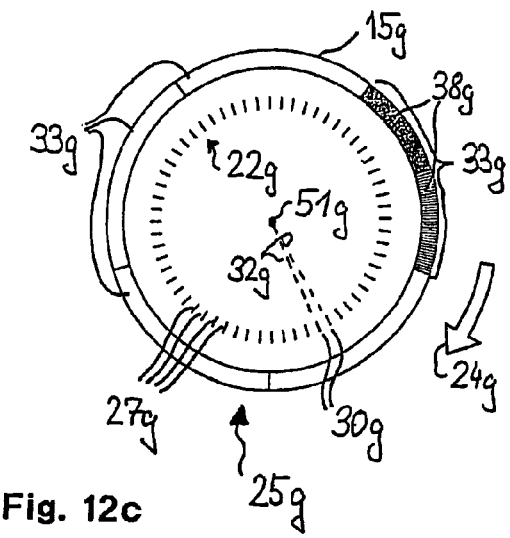
Figure 12A:
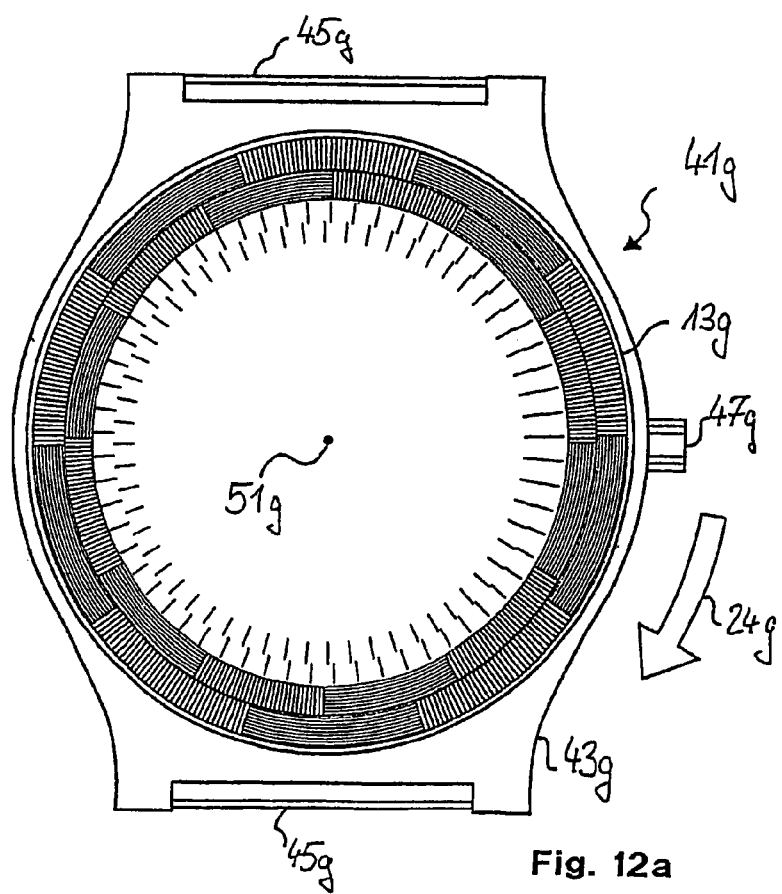

In the housing 43g a watchwork is provided which is not depicted in FIG. 12a and which drives disk 15g in an anticlockwise direction about the axis 51g at a uniform speed of 6° per hour relative to the housing 43g.

The indicator pattern 23g in FIG. 12b comprises $N_1=6$ identical partial patterns which are arranged along a direction of circumference 24g with respect to the rotational axis 51g in a periodic manner over an angle at circumference $L_1=360°$, i.e. the full circumference of the circle. Correspondingly, a circumferential distance between adjacent partial patterns 29f is 60°.

The indicator pattern 25g in FIG. 12c comprises $N_2=5$ identical partial patterns which are periodically arranged along a direction of circumference 24g with respect to the rotational axis 51g over an angle at circumference $L_2=360°$, i.e. the full circumference of the circle. Correspondingly, a circumferential distance between adjacent partial patterns 33g is 72°.

The first component in FIG. 12b additionally has an indicator pattern 21g which comprises $N_3=61$ partial patterns 26g which are arranged along a direction of circumference 24g with respect to the rotational axis 51g in a periodic manner over an angle at circumference $L_1=360°$, i.e. the full circumference of the circle. Correspondingly, a circumferential distance between adjacent partial patterns 26g is about 5.9°. The partial patterns 21g are lines 28g which extend along lines 31g which intersect axis 51g.

The second component in FIG. 12c additionally has an indicator pattern 22g which comprises $N_4=60$ partial patterns 27g arranged along a direction of circumference 24g with respect to the rotational axis 51g in a periodic manner over an angle at circumference of $L_2=360°$, i.e. the full circumference of the circle. Correspondingly, a circumferential distance between adjacent partial patterns 27g is 6°. The partial patterns 27g are lines 30g which extend along lines 32g which intersect axis 51g.

The following applies to a rule for reading the hours: that sub-pattern 38g of the indicator pattern 25g is identified which "covers" a sub-pattern 37g of the indicator pattern 23g over its entire length in the direction of circumference 24g, and which has, at the same time, the same configuration as that of sub-pattern 37g of indicator pattern 25g. The full hour is deduced from the orientation of the sub-pattern 38g about the rotational axis 51g in analogy to the division of hours on a conventional analogue watch. In the example shown in FIG. 12a, the third hour is therefore indicated.

For reading the minutes, the indicator patterns 21g and 22g are used: those two partial patterns 26g and 27g are identified which are the most likely to more or less exactly face each other. The position of these facing partial patterns 26g, 27g corresponds to the position of the minute hand of a conventional analogue watch. That means that in the embodiment shown in FIG. 12a, 15 minutes are indicated, i.e. the time is 3 o'clock and 15 minutes.

FIG. 13 shows a watch 41g', which is a variation of the watch 41g depicted in FIG. 12: it is a combination of the additional indicator patterns 21g, 22g for the indication of minutes as shown in FIG. 12 with the embodiments for the indication of hours as illustrated in FIGS. 2 to 4. Like components are denoted by the same reference signs.

A watchwork, which is not shown in 13a, is provided in the housing 43g' which watchwork drives disk 15g' about the axis 51g' at a uniform speed of 10°/hour relative to the housing 43g' in an anticlockwise direction.

Figure 13B:
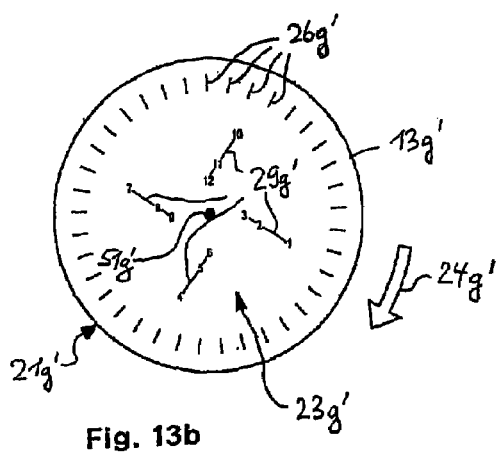

The indicator pattern 23g' in FIG. 13b comprises $N_1=4$ identical partial patterns 29g' which are arranged along a direction of circumference 24g' with respect to the rotational axis 51g' in a periodic manner over an angle at circumference $L_1=360°$, i.e. the full circumference of the circle. The partial patterns 29g' are each divided into sub-patterns 37g' by markings 52g'.

Figure 13C:
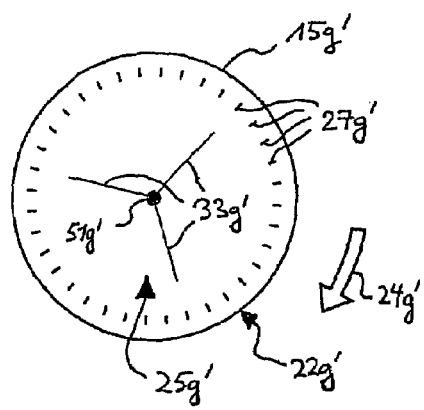

The indicator pattern 25g' in FIG. 13c comprises $N_2=3$ identical partial patterns 33g' which are arranged in a periodic manner along a direction of circumference 24g' with respect to the rotational axis 51g' over an angle at circumference $L_2=360°$, i.e. the full circumference of the circle.

The additional indicator patterns 21g', 22g' having $N_3=37$ partial patterns 26g' or $N_4=33$ partial patterns 27g', respectively, are designed in a manner corresponding to that of the embodiments shown in FIG. 12.

The hours are read by identifying an intersection 55d' of a partial pattern 29g' and a partial pattern 33g'. In the example shown in FIG. 13a, this intersection is located between the markings 52g' denoted by "7" and "8". Therefore, seven full hours are indicated.

The reading of the minutes corresponds to the reading of the minutes described with reference to FIG. 12. In the embodiment shown in FIG. 13a, the time 7 o'clock and 38 minutes is therefore indicated.

FIG. 14 shows a watch 41g″ which is a further variation of the watch 41g shown in FIG. 12: it is, again, a combination of the additional indicator patterns 21g, 22g illustrated in FIG. 12, this time for the indication of the hours, with one of the corresponding embodiments illustrated in FIG. 7 for the indication of the minutes. Like components are denoted by the same reference signs.

Figure 14B:
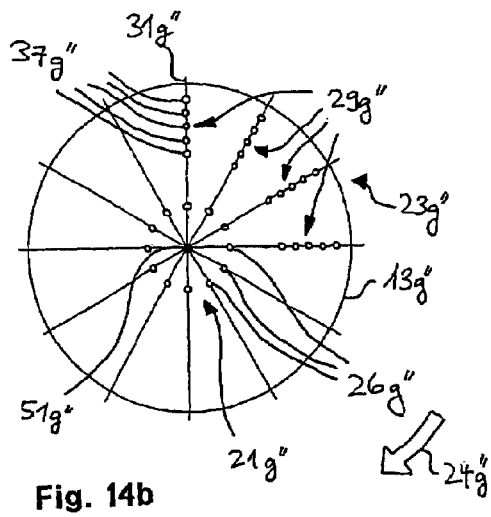

For the indication of the minutes, the indicator pattern 23g″ in FIG. 14b comprises $N_1=12$ identical partial patterns 29g″, which are arranged in a periodic manner along a direction of circumference 24g″ with respect to the rotational axis 51g″ over an angle at circumference $L_1=360°$, i.e. the full circumference of the circle. The partial patterns 29g″ are disposed along straight lines 31g″, which run through the rotational axis 51g″. Each partial pattern 29g″ has 5 sub-patterns 37g″.

Figure 14C:
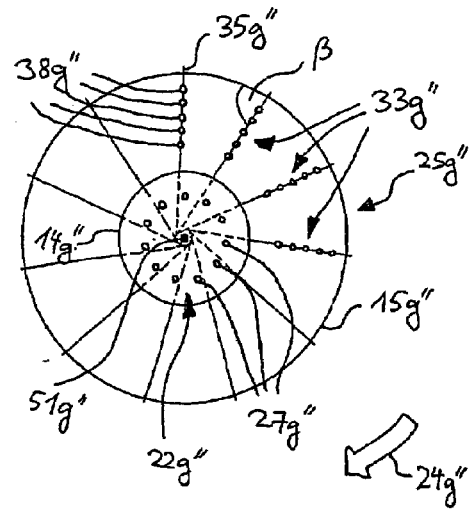
Figure 14A:
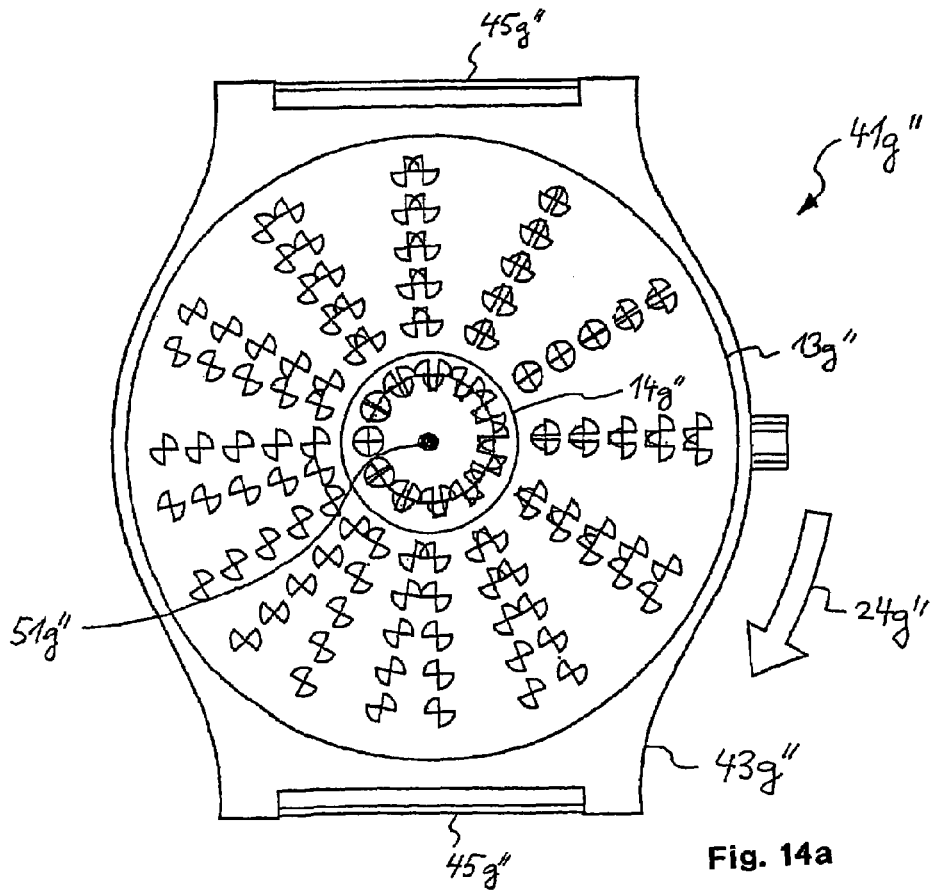

The indicator pattern 25g″ in FIG. 14c comprises $N_2=11$ identical patterns 33g″, which are arranged in a periodic manner along a direction of circumference 24g″ with respect to the rotational axis 51g″ over an angle at circumference $L_2=360°$, i.e. the full circumference of the circle. Equally, the partial patterns 33g″ are disposed along straight lines 35g″ which, in turn, are oriented at an angle β of less than 90° with respect to the direction of circumference and therefore do not intersect rotational axis 51g″. Equally, each partial pattern 33″ has 5 sub-patterns 38g″ which correspond to the sub-patterns 37g″ of partial patterns 29g″.

For the indication of the hours, the additional indicator patterns 21g″, 22g″ are each configured with partial patterns 26g″, 27g″ respectively, in correspondence to the embodiment shown in FIG. 12, but in contrast thereto, however, the number $N_3$ of the partial patterns 26g″ is 12 and the number $N_4$ of the partial patterns 27g″ is 11.

The additional indicator pattern 22g″ is disposed on a disk 14g″, which is decoupled from the disk 15g″ but is driven about the same axis 51g″. The disk 14g″ rotates at a uniform speed of (360°/11*12) per hour (about 2.72°/hour) in an anticlockwise direction relative to the indicator pattern 21g″, whereas the disk 13g″ with the indicator patterns 21g″ (for the hours) and 23g″ (for the minutes, see below) is resting relative to the housing 43g″.

The hours are read by way of identifying those two partial patterns 26g″ and 27g″ which have the same configuration (brightness, shade of colour, saturation of colour, texture, etc.) and are the most likely to face each other or overlap more or less exactly, i.e. match. The position of these two partial patterns 26g″ and 27g″ then indicates the hours. In the example shown in FIG. 14a, 9 hours are thus indicated.

Disk 15g″ with the indicator pattern 25g″ thereon rotates about the axis 51g″ at a uniform speed of 360°/11 per hour (about 32.72° per hour) in an anticlockwise direction relative to indicator pattern 23g″.

The reading of the minutes is similar to the method of reading the minutes described with reference to FIG. 7 or the above described method of reading the hours, respectively. Those two sub-patterns 37g″ and 38g″ are identified which have the same configuration (brightness, shade of colour, saturation of colour, texture, etc.) and are the most likely to face each other or overlap more or less exactly, i.e. match. In the embodiment illustrated in FIG. 14a, the time 9 o'clock and 7 minutes is therefore indicated.

FIG. 15 shows a further embodiment of an indicating device for a watch 41h, the construction of which substantially corresponds to that of FIG. 9. Like components are denoted by the same reference signs.

Figure 15B:
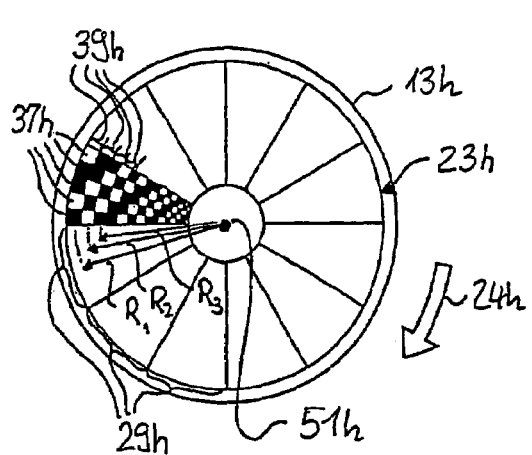

The indicator pattern 23h in FIG. 15b comprises $N_1$=12 identical partial patterns 29h, which are distributed along a direction of circumference 24h with respect to the rotational axis 51h in a periodic manner over an angle at circumference $L_1$=360°, i.e. the full circumference of the circle. Correspondingly, a circumferential distance between adjacent partial patterns 29h is 30°.

Figure 15C:
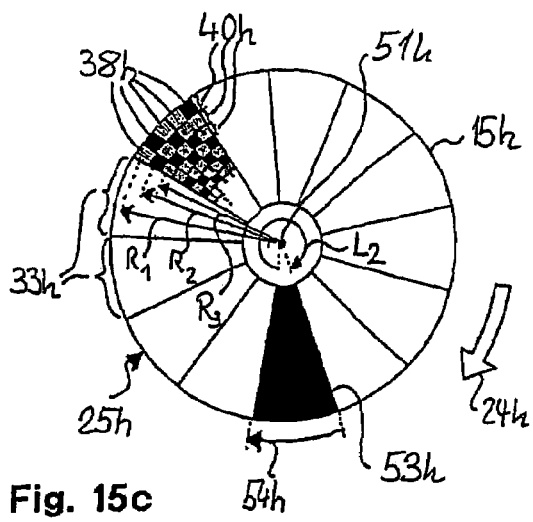

The indicator pattern 25h in FIG. 15c comprises $N_2$=12 identical partial patterns 33h, which are arranged within a portion of the circumference of $L_2$=330° in a periodic manner and thus have a distance of 27.5° from one another in the direction of circumference 24h.

For the sake of simplicity, only one sector or partial pattern 33h, 29h, respectively, is shown in FIGS. 15b and 15c.

The indicator pattern 25h is supplemented by a portion 53h, which is disposed within a region of a portion of the circumference 54h which is outside of the portion of the circumference $L_2$ in which the indicator pattern 25h with its partial patterns 33h is located. The portion 53h serves as the hour hand of watch 41h.

The partial patterns 29h are divided into 5 sub-patterns 37h in the direction of circumference 24h, with the sub-patterns 37h, in turn, being further divided in segments of a circle 39h which are concentric with respect to the axis 51h and which have different radii R1, R2, R3, etc. The sub-patterns 37h on a segment of the circle 39h differ from one another by virtue of their configuration, i.e. brightness, shade of colour, saturation of colour, texture, transparency, etc., wherein each sub-pattern has an identical counterpart, thus forming groups of two identical sub-patterns. In the embodiment shown in FIG. 15b, these two sub-patterns 37h are transparent in order to allow to perceive the sub-patterns 38h that are disposed underneath. The other three sub-patterns 37h of the same segment of the circle 39h are also identical but different from the other two sub-patterns 37h. In the embodiment illustrated in FIG. 15b, these three sub-patterns 37h are indicated by black colouring.

The partial patterns 33h are divided into five sub-patterns 38h in the direction of circumference 24h, wherein the sub-pattern 38h are, in turn, further divided in segments of a circle 40h which are concentric with respect to the axis 51h and which have different radii R1, R2, R3, etc. The sub-patterns 38h on a segment of a circle 40h differ from each other by virtue of their configuration, i.e. brightness, shade of colour, saturation of colour, texture, transparency, etc., wherein two sub-patterns 38h at the time are identical. In the embodiment shown in FIG. 15b, these two sub-patterns 37h are indicated by a black colouring. The other three sub-patterns 38h of the same segment of a circle 40h. are also identical but different from the other two sub-patterns 38h. In the embodiment illustrated in FIG. 15c, these three sub-patterns 38h are represented by hatched areas.

Furthermore, the following conditions may apply:

- The radii R1, R2, etc. of the segments of a circle 39h are equal to the radii R1, R2, etc. of the segments of a circle 40h.
- The three identical sub-patterns 37h of a segment of a circle 39h having a radius R1 are identical in terms of their configuration with the two identical sub-patterns 38h of a segment of a circle 40h having the same radius R1.
- The sub-patterns 37h of the outermost segment of a circle 39h having a radius R1 are disposed with respect to the sub-patterns 38h of the outermost circular segments 40h having a radius R1 such that they are complementary in terms of their configuration in the direction of circumference 24h.
- The sub-patterns 37h of the segments of a circle 39h are cyclically exchanged with respect to sub-pattern 37h of adjacent segments of a circle 39h. Likewise, sub-patterns 38h of segments of a circle 40h are cyclically exchanged with respect to the sub-patterns 38h of adjacent segments of a circle 40h.

Figure 15A:
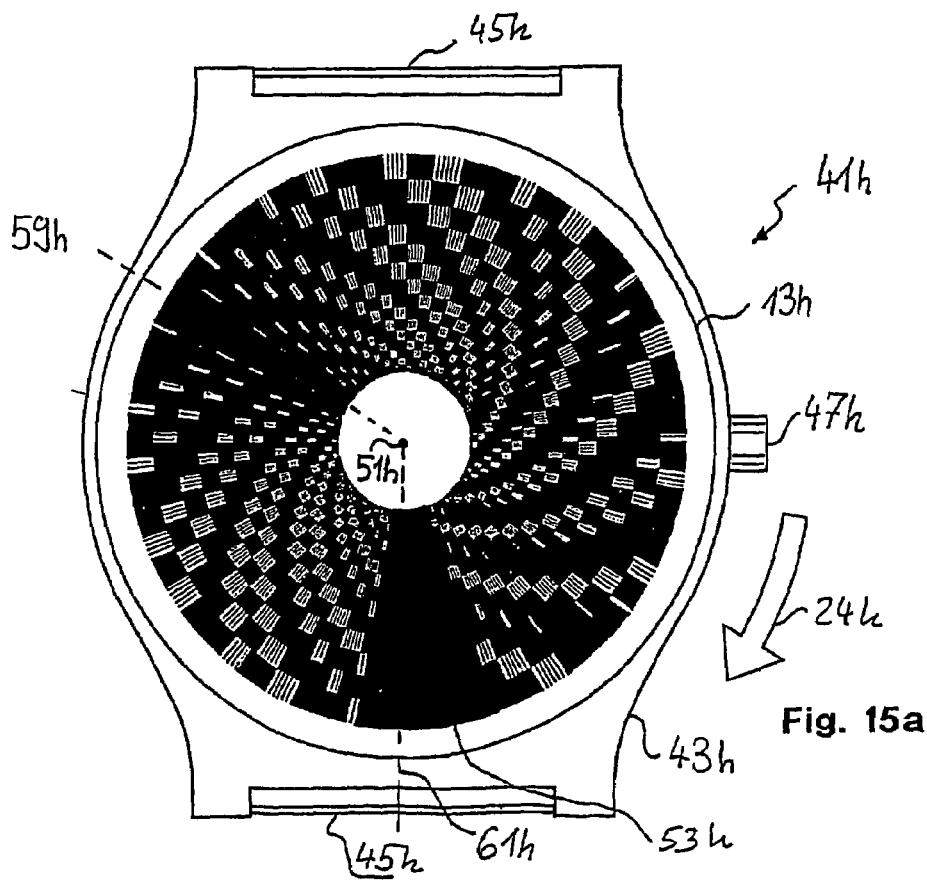

The method of reading the watch illustrated in FIG. 15a is as follows: first, the portion 53h is localised and the full hour deduced from the orientation thereof about the rotational axis 51h. In the depicted example, portion 53h moves over the 6 o'clock line, i.e. 6 full hours are indicated.

As a rule for reading the minutes, the following applies: first, that area is identified in which the sub-pattern 37h of the partial patterns 29h is in registry with the sub-patterns 38h of the partial patterns 33h along a line 59h, which intersects the axis 51h, such that only those sub-patterns 37h, 38h that have the same configuration are perceptible. The angle between a line 61h, over which portion 53h moves and which also extends through the axis 51c and would be disposed in correspondence to the marks for the hours in a conventional analogue watch, and line 59h corresponds to the minutes past an hour. Applied to the embodiment depicted in FIG. 15a, this means: The portion 53h just moves over line 61h, which represents the "6 o'clock"—or "30 minutes"—mark in a conventional analogue watch; along the line 59h sub-patterns 37h, 38h having the same configuration (in this case black colour) are in registry, wherein the position of line 59h with respect to the axis 51h corresponds approximately to the "50 minutes"- mark in a conventional analogue watch. The angle between the line 61h and the line 59h is about 120°, i.e. in analogy to a conventional analogue watch, 20 minutes have passed since 6° correspond to one minute. In FIG. 15a, the time 6 hours and 20 minutes (20 minutes past six o'clock) is depicted.

It is also possible that a plurality, i.e. more than two, sub-patterns 37h and 38h of the respective partial patterns 29h and 33h differ from one another. However, in those embodiments the above condition still needs to be satisfied, i.e. the sub-patterns of adjacent segments of a circle need to be cyclically exchanged.

In case of a plurality, i.e. more than two sub-patterns 37h and 38h of the respective partial patterns 29h and 33h, the indicator patterns 23h and 25h can also be distributed over at least two indication planes, wherein the indication planes of one indicator pattern are disposed between the indication planes of the other indicator pattern in a rotatable manner.

Figure 16B:
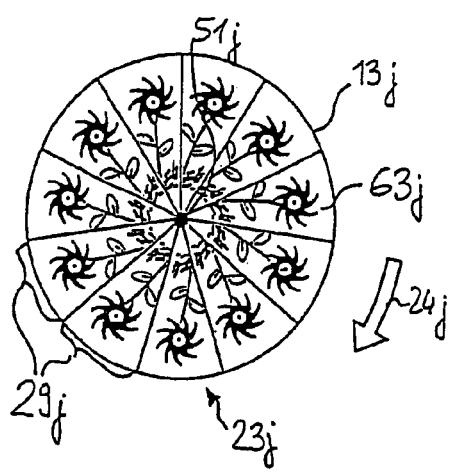
Figure 16C:
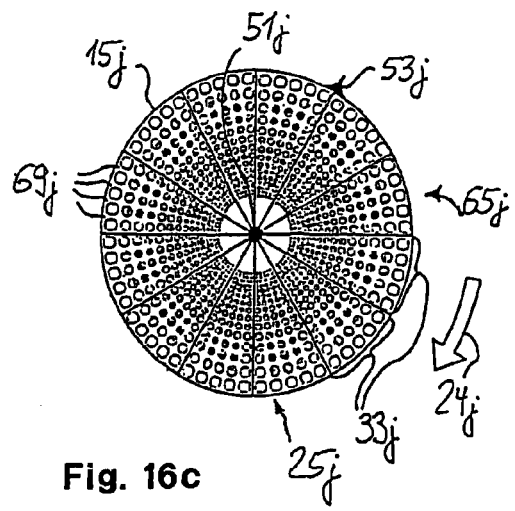
Figure 16A:
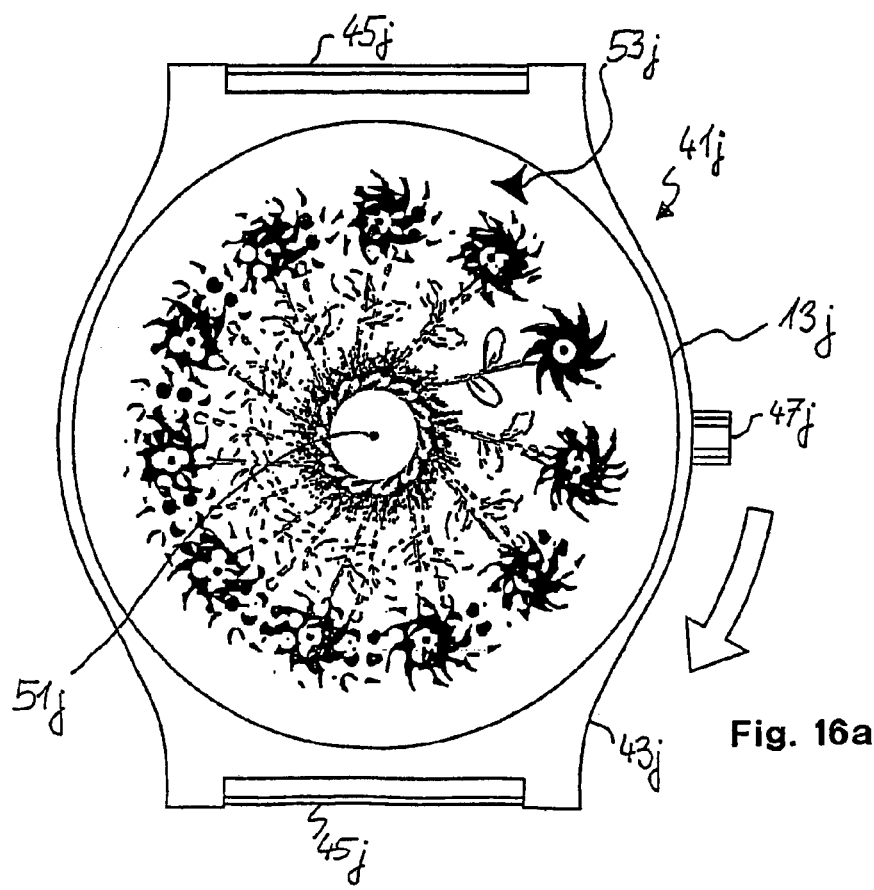

FIG. 16 shows a further embodiment of an indicating device for a watch 41j, the construction of which substantially corresponds to that shown in FIG. 9. Like components are denoted by the same reference signs.

A first indicator pattern 23j in FIG. 16b comprises $N_1=11$ identical partial patterns 29j, which are distributed along a direction of circumference 24j with respect to the rotational axis 51j in a periodic manner over an angle at circumference $L_1=360°$, i.e. the full circumference of the circle. Correspondingly, a circumferential distance between adjacent partial patterns 29j is about 32.72°.

A second indicator pattern 25j in FIG. 16c comprises $N_2=12$ identical partial patterns 33j, which are distributed along a direction of circumference 24j with respect to the rotational axis 51j in a periodic manner over an angle at circumference $L_2=360°$, i.e. the full circumference of the circle. Correspondingly, a circumferential distance between adjacent partial patterns 33j is 30°.

Disk 15j has a marking 53j, which serves as the hour hand of watch 41j.

Each partial pattern 29j of indicator pattern 23j has a basic pattern 63j, which is the same in all partial patterns 29j.

Equally, each partial pattern 33j of indicator pattern 25j has a basic pattern 65j, which is the same in all partial patterns 33j, and was generated by modification of the basic pattern 63j.

Figure 17:
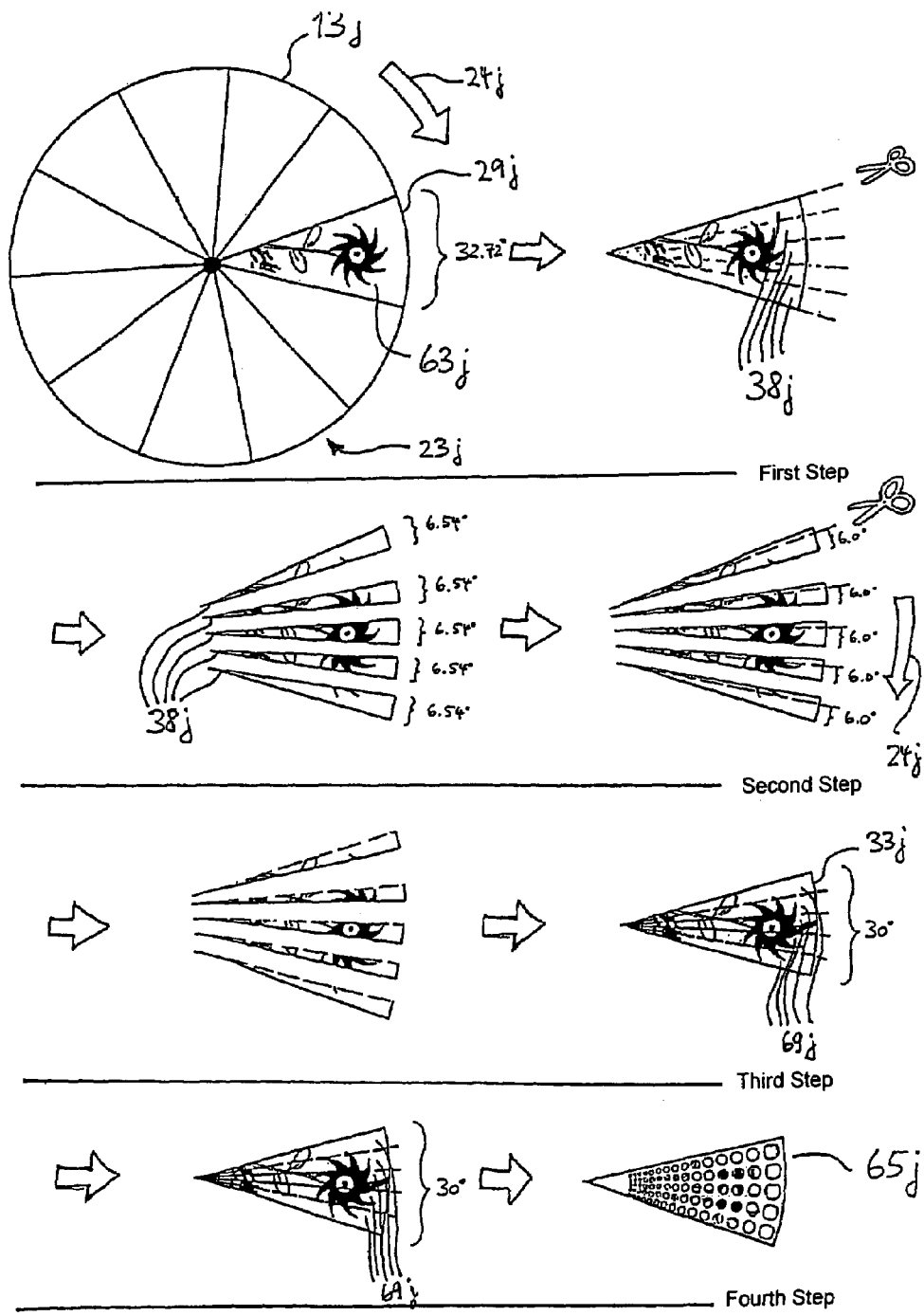
FIG. 17 shows the embodiment of the method for generating an indicator pattern according to the present invention.

With reference to FIG. 17, the method for generating the modified basic pattern 65j is explained by means of a single exemplary basic pattern 63j:

A partial pattern 29j having a basic pattern 63j is, in a preferred embodiment, segmented into five equal sub-patterns 38j, for instance by cutting (see first step in FIG. 17). It is also conceivable to carry out the segmentation into less than five or more than five sub-patterns 38j, respectively. Since each sub-pattern 29j covers an angle of about 32.72° in the direction of circumference 24j, the five generated sub-patterns 38j each move over an angle of about 6.54°.

In a second step, the five sub-patterns 38j are each reduced to an angle of 6° in the direction of circumference 24j, for instance by means of cutting.

Subsequently, the five sub-patterns are joined together in the third step in FIG. 17 such that a partial pattern 33j is generated which comprises five sub-patterns 69j and covers an angle of 30° in the direction of circumference 24j and which has a basic pattern 65j, which is a modified basic pattern of the basic pattern 63j.

In a fourth step, the basic pattern 65j is modified such that it comprises a plurality of transparent portions which are disposed between remaining non-transparent portions. In FIG. 17, the non-transparent portions are portions which are spaced apart and in the form closed rings, which portions bear the pattern. In between the pattern-bearing portions, the disk 15j is transparent and allows to view disk 13j underneath, which disk 13j bears the partial pattern 29j. When a thus-modified basic pattern 65j is placed in registry on a non-modified basic pattern 63j the modified basic pattern 65j with the transparent portions allows to partially view the non-modified basic pattern 63j, wherein the non-transparent portions of the modified basic pattern together with the non-modified basic pattern that lies underneath give an optical impression which is substantially identical to the undisturbed basic pattern 63j.

The method described above needs to be carried out for each partial pattern 33j of the indicator pattern 25j such that the indicator pattern 25j depicted in FIG. 13c is generated.

Other methods for generating a first and second indicator pattern having a basic pattern or modified-basic pattern, respectively, are conceivable, wherein the reduction in length of basic pattern 63j in the direction of extension 24j may be achieved, for instance, by compressing the basic pattern 63j in the direction of extension 24j.

Figure 13A:
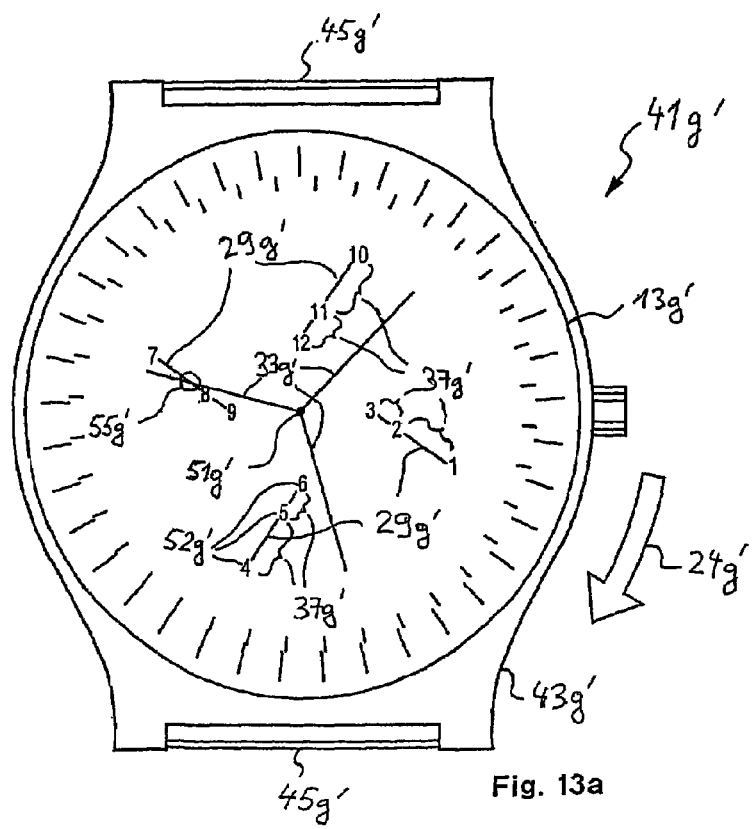

Disk 15j with the indicator pattern 25j is now disposed over disk 13j with the indicator pattern 23j such that the upper of the two indicator patterns allows the lower of the two indicator patterns to be viewed through the plurality of transparent portions, as illustrated in FIG. 13a.

The way of reading the watch depicted in FIG. 13a is as follows: first, the marking 53j is localised and the full hour deduced from the orientation thereof about the rotational axis 51j. In the illustrated embodiment, it is therefore 1 o'clock.

As a rule for reading the minutes, the following applies: in the direction of rotation, that is in a clockwise direction, that sub-pattern 38j, which is part of a basic pattern 63j is identified, which is the most likely to give the impression of a uniform and undisturbed picture upon viewing through a sub-pattern 69j, which is part of a basic pattern 65j. The position of this sub-pattern 69j then indicates the minutes in a similar fashion as the minute hand of a conventional analogue watch.

In the embodiment shown in FIG. 13a, the time indicated is therefore 1 o'clock and about 11 minutes.

The embodiments of the position indicating device explained above by means of a watch can also be applied to other applications such as, for instance, the indication of physical quantities such as time, speed, content of a container, height, pressure, temperature, or to the indication of quantities that are not immediately physical such as star signs, ascendants, status quo of tills, market prices, etc.

In particular, the numbers $N_1$ and $N_2$ of the values 3, 4, 5, 6, 11, 12, 23, 24, 25, respectively, can be changed to other values suitable for the purposes of the indicating device. In a similar manner, the number of sub-patterns can be adapted to the respective application in any is suitable fashion.

Furthermore, motives that are different from the motives described above can, of course, be used for the partial patterns and sub-patterns.

Summarized, a position indicator comprises a first indicator pattern composed of a plurality of substantially identical first partial patterns periodically arranged in a direction of extension, and a second indicator pattern composed of a plurality of substantially identical second partial patterns periodically arranged in the direction of extension. The first partial patterns may extend along a first line extending transversely to the direction of extension, and the second partial patterns may extend along a second line extending transversely to the first line and the direction of extension The first and second partial patterns may be each composed of plural sub-patterns disposed adjacent to one another in the direction of extension. The sub-patterns of each pair of sub-patterns of the respective partial pattern are different from each other.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A position indicator for indicating a relative position of two components, the position indicator comprising:
   a first component and a second component which are displaceable relative to each other;
   a first indicator pattern fixedly disposed on the first component, and a second indicator pattern fixedly disposed on the second component,
   wherein the first indicator pattern extends in a direction of extension over a first length, and wherein the first indicator pattern is composed of a plurality of substantially identical first partial patterns, wherein the first partial patterns are substantially periodically arranged in the direction of extension,
   wherein the second indicator pattern extends in the direction of extension over a second length, and wherein the second indicator pattern is composed of a plurality of substantially identical second partial patterns, wherein the second partial patterns are substantially periodically arranged in the direction of extension,
   wherein the first partial pattern is composed of a plurality of sub-patterns, wherein the sub-patterns of the first partial pattern are disposed adjacent to one another in the direction of extension of the indicator patterns, and wherein the sub-patterns of each pair of the plurality of sub-patterns of the first partial pattern are different from each other, and
   wherein the second partial pattern is composed of a plurality of sub-patterns, wherein the sub-patterns of the second partial pattern are disposed adjacent to one another in the direction of extension of the indicator patterns, and wherein the sub-patterns of each pair of the plurality of sub-patterns of the second partial pattern are different from each other.

2. The position indicator according to claim 1, wherein each sub-pattern of the first partial pattern has associated therewith a corresponding sub-pattern of the second partial pattern,
   wherein the sub-patterns of the first and second partial patterns are arranged such that, at every position of relative displacement of the first and second components, there exists a location where one of the sub-patterns of the first partial pattern is disposed at least one of adjacent to and overlapping with the sub-pattern of the second partial pattern corresponding to the one sub-pattern of the first partial pattern.

3. The position indicator according to claim 1, wherein each sub-pattern of the first partial pattern differs in at least one optical property from the corresponding sub-pattern of the second partial pattern associated therewith by a lesser extent than from each other sub-pattern of the second partial pattern.

4. The position indicator according to claim 3, wherein the optical property comprises at least one of a brightness, a shade of colour, a saturation of colour, and a texture.

5. The position indicator according to claim 1, wherein the first and second components are rotatable relative to each other about an axis of rotation.

6. The position indicator according to claim 5, wherein the sub-patterns of the first and second partial patterns are formed of lines extending away from the axis of rotation.

7. The position indicator according to claim 6, wherein the lines of the sub-patterns of the first partial pattern extend to different radial distances from the axis of rotation,
   wherein the lines of the sub-patterns of the second partial pattern extend to different radial distances from the axis of rotation, and
   wherein a difference in the radial extension of each sub-pattern of the first partial pattern and the corresponding sub-pattern of the second partial pattern associated therewith is less than between the sub-pattern of the first partial pattern and each other sub-pattern of the second partial pattern.

8. The position indicator according to claim 1, wherein a number of the first partial patterns is 12 and wherein a number of the second partial patterns is 13.

9. The position indicator according to claim 1, wherein a number of the first partial patterns is 11 and wherein a number of the second partial patterns is 12.

10. The position indicator according to claim 5, further comprising a plurality of first markings that are disposed on the first component such that they are distributed around a circumference thereof at equal distances from one another, and a plurality of second markings that are disposed on the second component such that they are distributed around a circumference thereof at equal distances from one another, and wherein a number of the first markings differs from a number of the second markings by one.

11. The position indicator according to claim 10, wherein the number of the second markings is sixty.

12. The position indicator according to claim 5, a number of the different sub-patterns is five.

13. The position indicator according to claim 1, wherein the first indicator pattern is distributed over at least two indication planes, and wherein at least a portion of the second indicator pattern is sandwiched between the at least two indication planes.

14. A watch comprising the position indicator according to claim 1.

15. A measuring apparatus comprising a sensor and a position indicator according to claim 1 for indicating a measuring result of the sensor.

16. The measuring apparatus according to claim 15, wherein the sensor is configured to detect at least one of a time, a velocity, a content of a container, a length, a temperature and a pressure.

17. A method for indicating at least one physical quantity comprising:
   determining at least one physical quantity; and
   indicating the at least one physical quantity using the position indicator of claim 1.

18. The method of claim 17 wherein the physical quantity comprises a time, a velocity, a content of a container, a length, a temperature and a pressure.

* * * * *